US008950622B1

(12) United States Patent (10) Patent No.: US 8,950,622 B1
Blucher et al. (45) Date of Patent: *Feb. 10, 2015

(54) COVERS AND CONTAINMENT SYSTEMS AND METHODS FOR FOOD SERVICE PANS

(71) Applicant: M & Q IP Leasing, Inc., Wilmington, DE (US)

(72) Inventors: Timothy L. Blucher, Towson, MD (US); Michael D. Schmal, Orwigsburg, PA (US); Ernest E. Bachert, Orwigsburg, PA (US); Joseph A. Radosta, Easton, PA (US)

(73) Assignee: M & Q IP Leasing, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/262,124

(22) Filed: Apr. 25, 2014

(51) Int. Cl.
 *A47J 36/06* (2006.01)
 *A47F 10/06* (2006.01)
 *A47G 23/08* (2006.01)

(52) U.S. Cl.
 CPC ............. *A47F 10/06* (2013.01); *A47G 23/08* (2013.01)
 USPC .......................... 220/573.1; 383/120; 220/287

(58) Field of Classification Search
 CPC ............ A47J 36/06; A47J 36/16; A47J 36/00
 USPC ..................... 220/574.3, 574, 495.03, 495.06, 220/495.01, 23.86, 23.83, 573.1, 359.1, 220/287; 383/120; 229/87.08; 215/317, 321
 See application file for complete search history.

(56) References Cited

U.S. PATENT DOCUMENTS

| 1,600,741 | A | * | 9/1926 | Sherman | 99/426 |
| 2,080,108 | A | * | 5/1937 | Brandstein | 215/321 |
| 2,975,931 | A | * | 3/1961 | Harrison | 220/200 |
| 4,932,556 | A | * | 6/1990 | Hui et al. | 383/99 |
| 5,529,395 | A | * | 6/1996 | French | 383/75 |
| 5,534,277 | A |   | 7/1996 | Ramesh et al. | |
| 6,276,551 | B1 | * | 8/2001 | Miller, II | 220/287 |
| 6,293,458 | B1 | * | 9/2001 | Sarnoff | 229/5.82 |

(Continued)

FOREIGN PATENT DOCUMENTS

| EP | 0 573 306 A2 | 12/1993 |
| FR | 2834694 | 7/2003 |
| WO | WO 2012/049131 A1 | 4/2012 |

OTHER PUBLICATIONS

Co-pending U.S. Appl. No. 13/973,752, filed Aug. 22, 2013.

(Continued)

*Primary Examiner* — Steven A. Reynolds
*Assistant Examiner* — King M Chu
(74) *Attorney, Agent, or Firm* — Sterne, Kessler, Goldstein & Fox P.L.L.C.

(57) ABSTRACT

A heat-shrinkable food pan cover provides a safe, low cost way to cover a food service pan during food preparation, storage, cooking, transport, and reheating. The food pan cover can have first and second side panels. A gusset having first and second gusset panels can be formed between the first and second side panels. A width of each of the gusset panels can be greater than a width of each of the side panels. A first side seal can extend along a portion of a first end, sealing together a portion of each of the first side panel, second side panel, first gusset panel, and second gusset panel. A second side seal can extend along a portion of a second end, sealing together a portion of each of the first side panel, second side panel, first gusset panel, and second gusset panel.

28 Claims, 31 Drawing Sheets

GUSSET TOP SIDE SEAL COVER
WITH SHORT SIDES
( SECTION VIEW )

(56) References Cited

U.S. PATENT DOCUMENTS

| | | | |
|---|---|---|---|
| 6,398,060 B1* | 6/2002 | Apostolides | 220/573.1 |
| 6,739,113 B1* | 5/2004 | Kocher et al. | 53/442 |
| 6,979,494 B2 | 12/2005 | Berrier et al. | |
| 7,163,120 B1* | 1/2007 | Blucher | 220/573.4 |
| 7,200,977 B2 | 4/2007 | Ramesh et al. | |
| 7,318,534 B2* | 1/2008 | Turvey et al. | 220/287 |
| 7,504,158 B2 | 3/2009 | Berrier et al. | |
| 7,631,776 B2* | 12/2009 | Vovan et al. | 220/266 |
| 7,687,123 B2 | 3/2010 | Broadus et al. | |
| 7,709,069 B2 | 5/2010 | Schmal et al. | |
| 7,824,749 B2 | 11/2010 | Dawes | |
| 8,129,997 B2 | 3/2012 | Heo et al. | |
| 8,202,612 B2 | 6/2012 | Brennan et al. | |
| 8,251,239 B2* | 8/2012 | Yeung | 220/240 |
| 8,394,470 B2* | 3/2013 | Dawes et al. | 428/34.9 |
| 2001/0019060 A1* | 9/2001 | Zank | 220/573.1 |
| 2003/0226846 A1* | 12/2003 | Horwath | 220/287 |
| 2004/0099666 A1* | 5/2004 | Ordiway | 220/287 |
| 2004/0099667 A1* | 5/2004 | Ackerman et al. | 220/287 |
| 2004/0146223 A1* | 7/2004 | Marquet et al. | 383/6 |
| 2004/0251256 A1* | 12/2004 | Turvey et al. | 220/287 |
| 2005/0115970 A1* | 6/2005 | Watson | 220/287 |
| 2006/0131308 A1* | 6/2006 | Drake | 220/229 |
| 2006/0210743 A1 | 9/2006 | Bekele | |
| 2007/0164035 A1* | 7/2007 | Blucher | 220/573.4 |
| 2008/0169294 A1* | 7/2008 | Liebzeit | 220/573.1 |
| 2008/0169295 A1* | 7/2008 | Liebzeit | 220/573.1 |
| 2008/0182051 A1 | 7/2008 | Rivers et al. | |
| 2008/0182052 A1 | 7/2008 | Broadus et al. | |
| 2009/0183807 A1* | 7/2009 | Sadlier | 150/154 |
| 2010/0221391 A1* | 9/2010 | Deng et al. | 426/114 |
| 2010/0320260 A1* | 12/2010 | Moghaddam Javid et al. | 229/87.08 |
| 2011/0248036 A1 | 10/2011 | Peplinski | |
| 2012/0225227 A1 | 9/2012 | Radosta et al. | |
| 2014/0023745 A1* | 1/2014 | Galluch et al. | 426/8 |
| 2014/0023747 A1* | 1/2014 | Galluch et al. | 426/8 |
| 2014/0131363 A1* | 5/2014 | Mir | 220/573.1 |

OTHER PUBLICATIONS

"Gastronorm Containers", BLANCO Professional, Oberderdingen, Germany, pp. 11-32, available at http://www.blanco-germany.com/c3/cms/_www/files/pdf3/BLANCO_Pro_01_GN_en.pdf.
Non-Final Office Action for U.S. Appl. No. 13/973,752, mailed Aug. 25, 2014, 8 pages.

* cited by examiner

PLAIN SIDE SEAL COVER
( UNFOLDED )

PLAIN SIDE SEAL COVER
(SECTION VIEW)

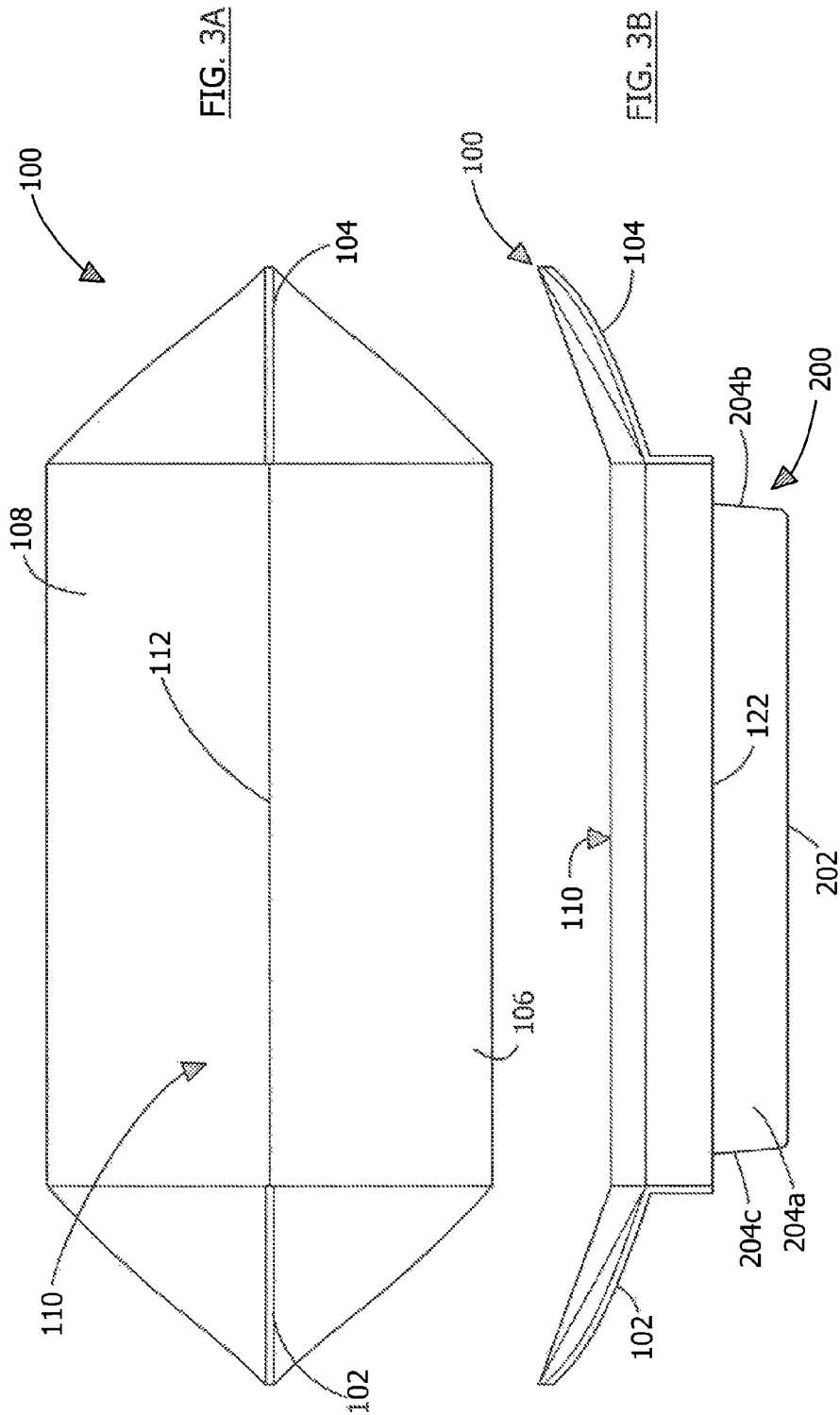

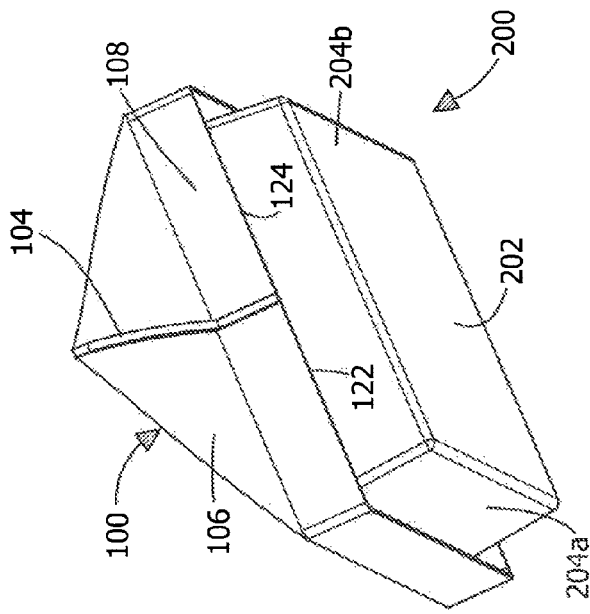
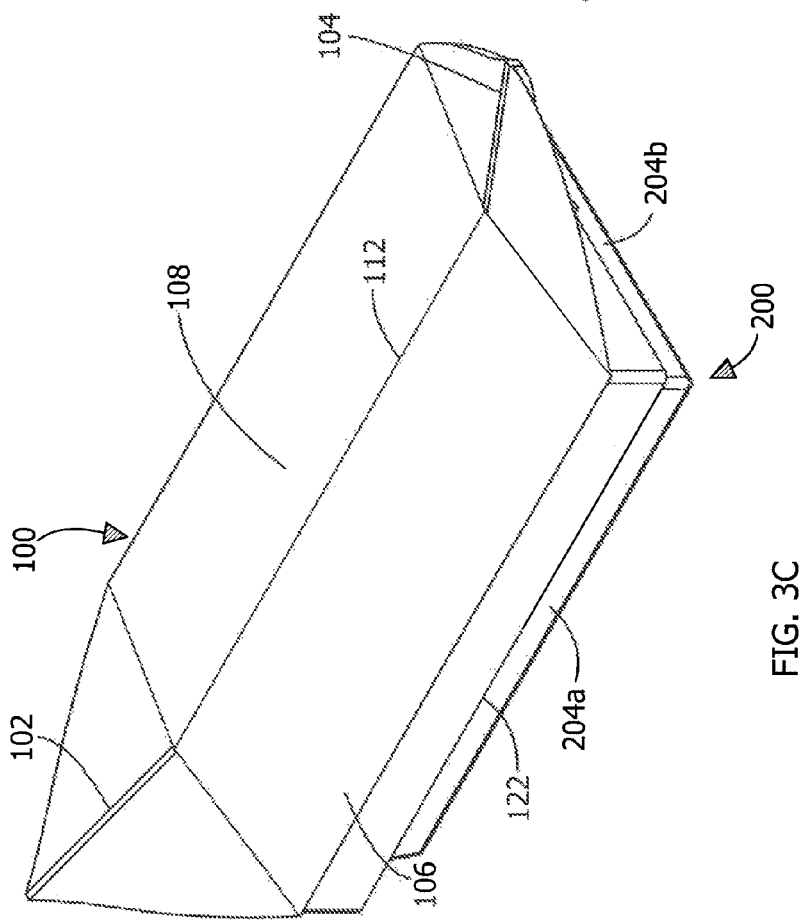
FIG. 3D
FIG. 3C
PLAIN SIDE SEAL COVER
( PRIOR TO SHRINK )

PLAIN SIDE SEAL COVER
(AFTER SHRINK)

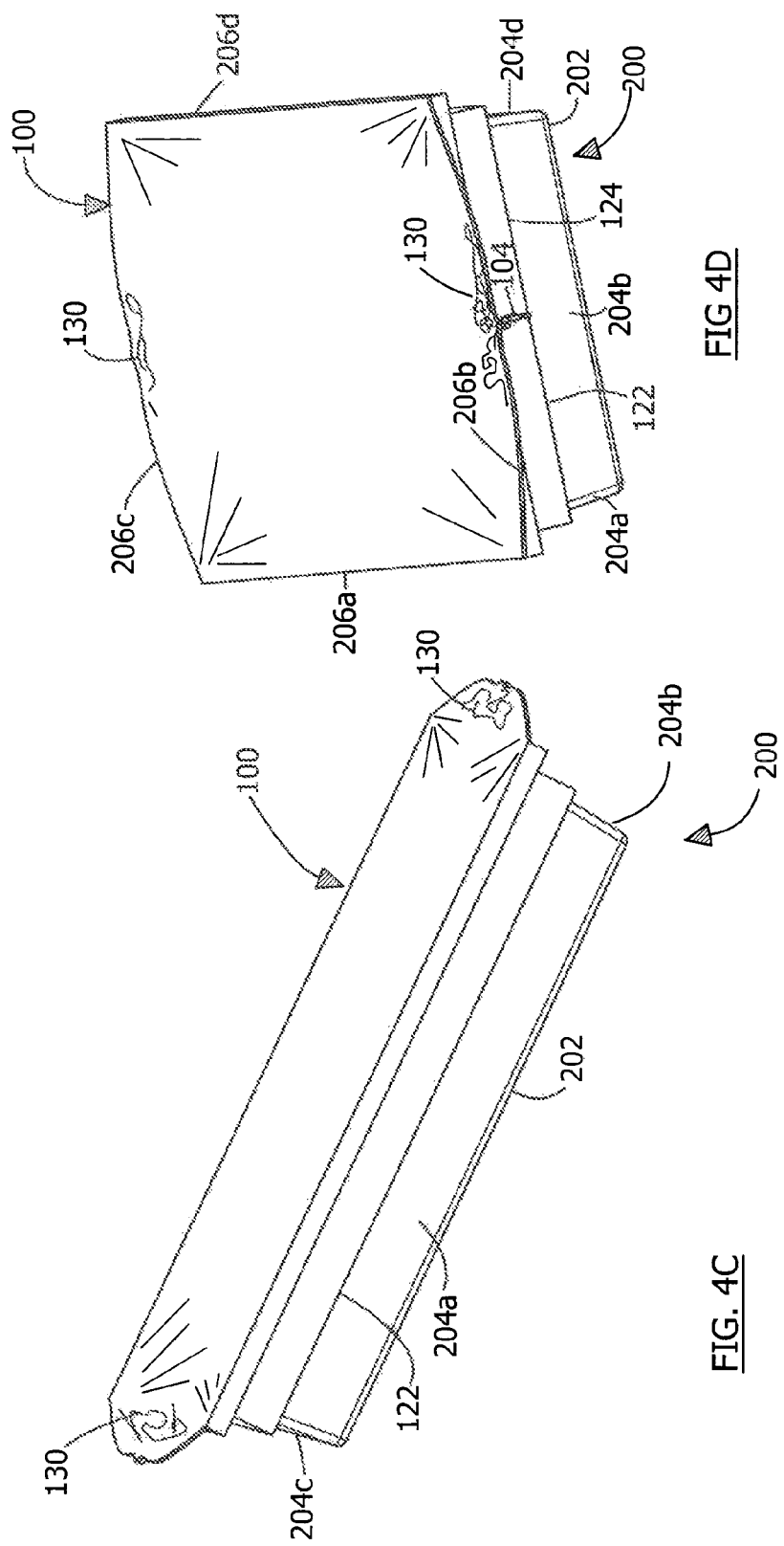

SIDE SEAL COVER
WITH CONTOUR SEAL
(UNFOLDED)

SIDE SEAL COVER
WITH CONTOUR SEAL
(SECTION VIEW)

SIDE SEAL COVER
WITH CONTOUR SEAL
(PRIOR TO SHRINK)

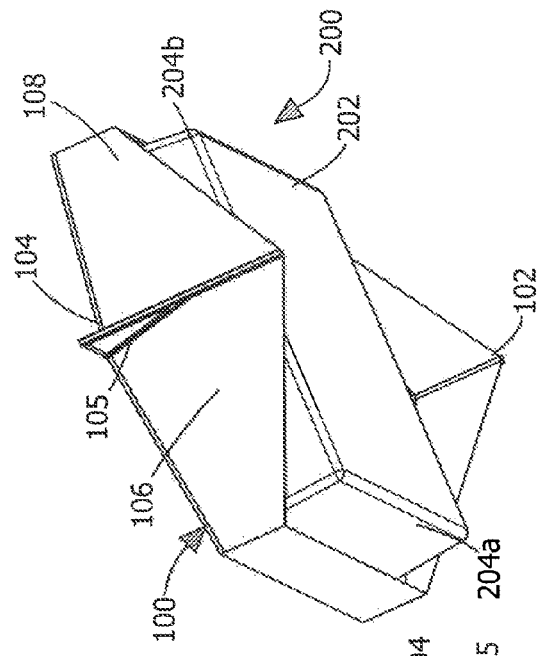
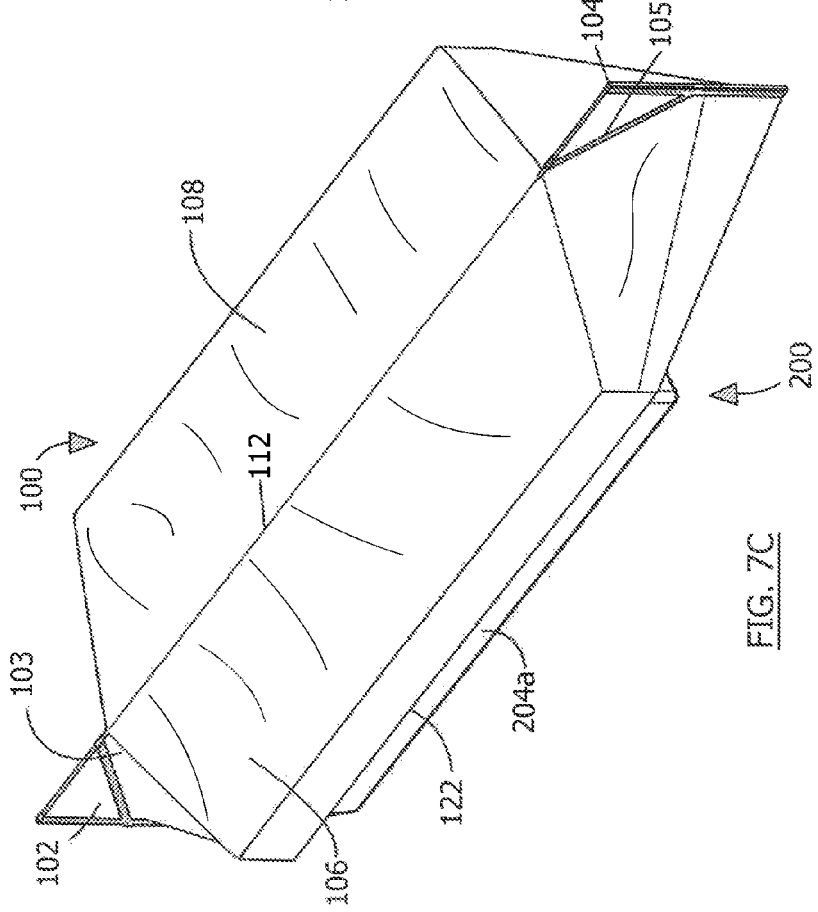
FIG. 7C
SIDE SEAL COVER
WITH CONTOUR SEAL
( PRIOR TO SHRINK )
FIG. 7D

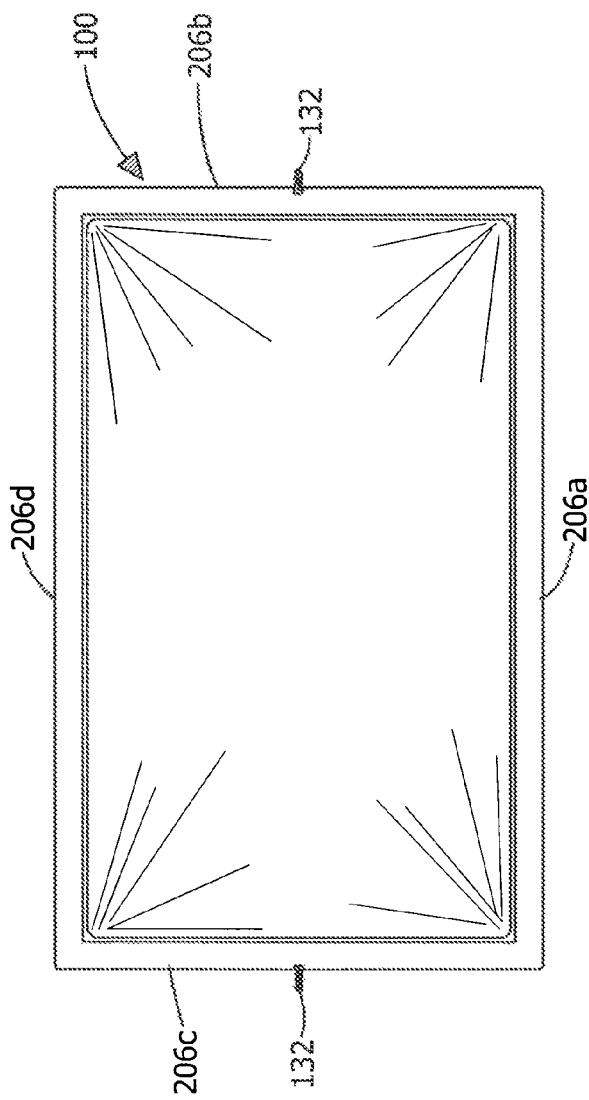
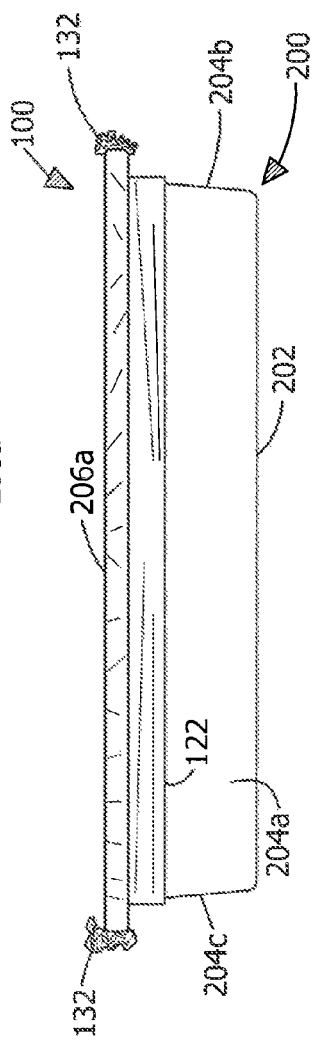
FIG. 8A
FIG. 8B
SIDE SEAL COVER WITH CONTOUR SEAL (AFTER SHRINK)

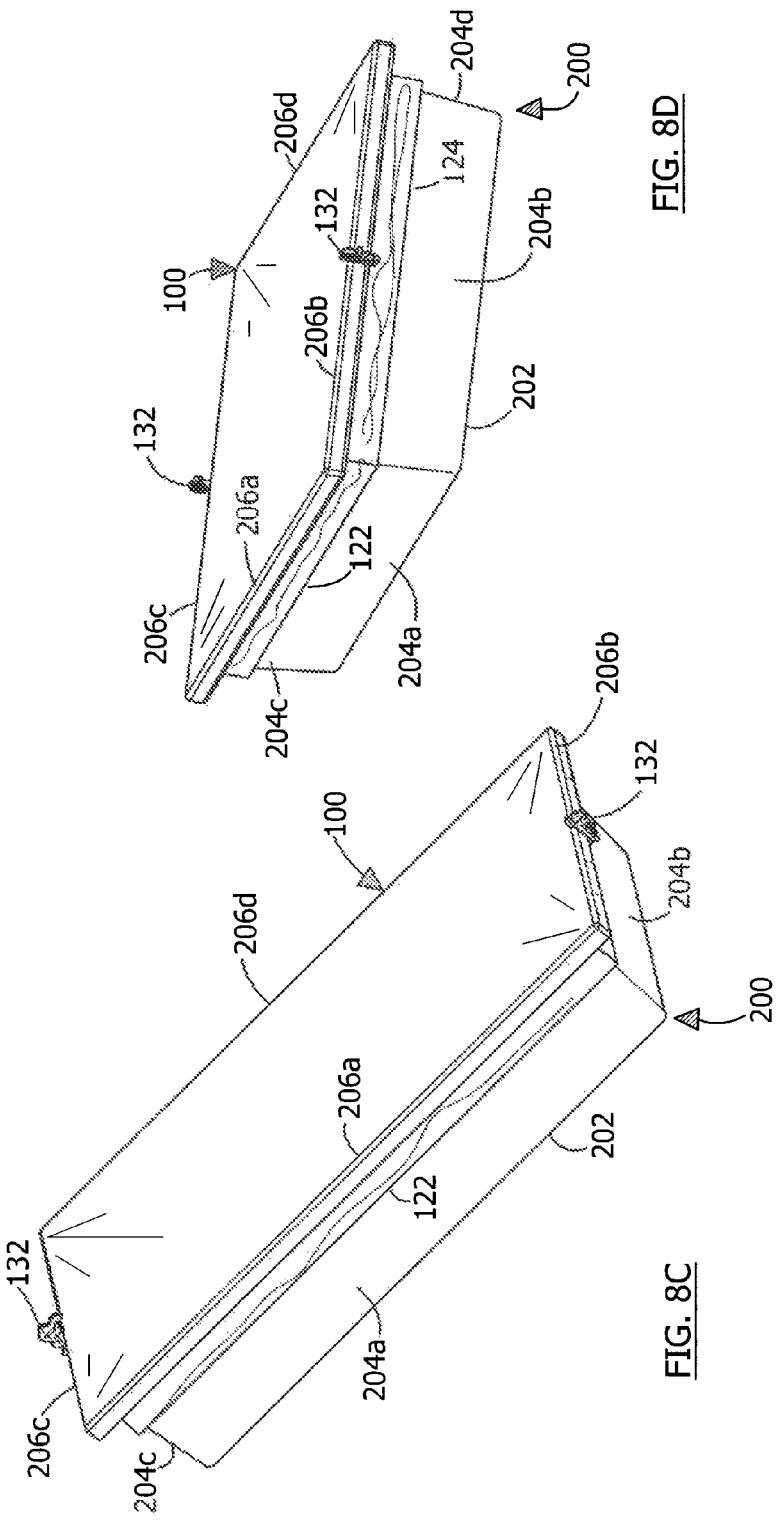

GUSSET TOP SIDE SEAL COVER
( UNFOLDED )

GUSSET TOP SIDE SEAL COVER
(SECTION VIEW)

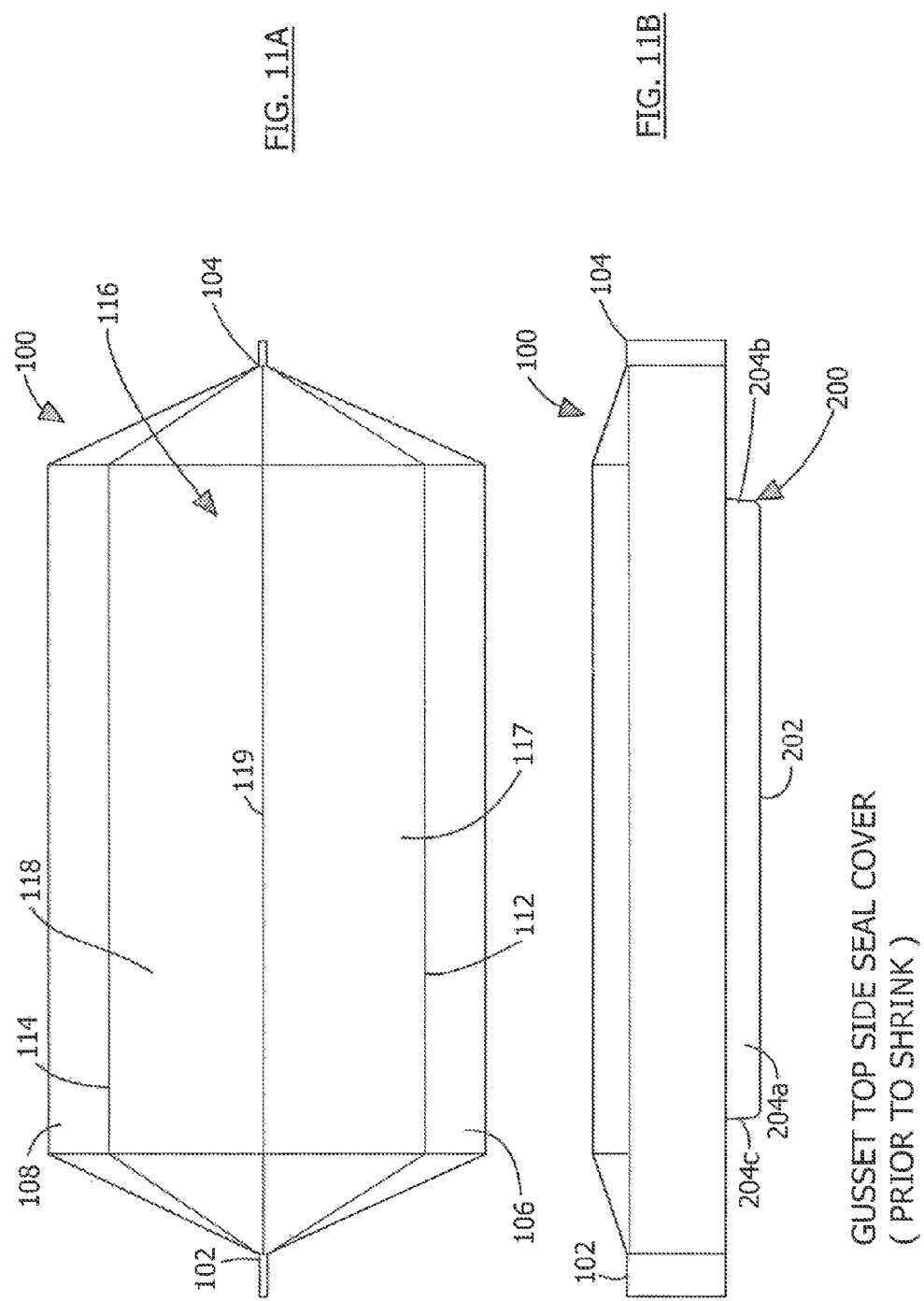

GUSSET TOP SIDE SEAL COVER
( PRIOR TO SHRINK )

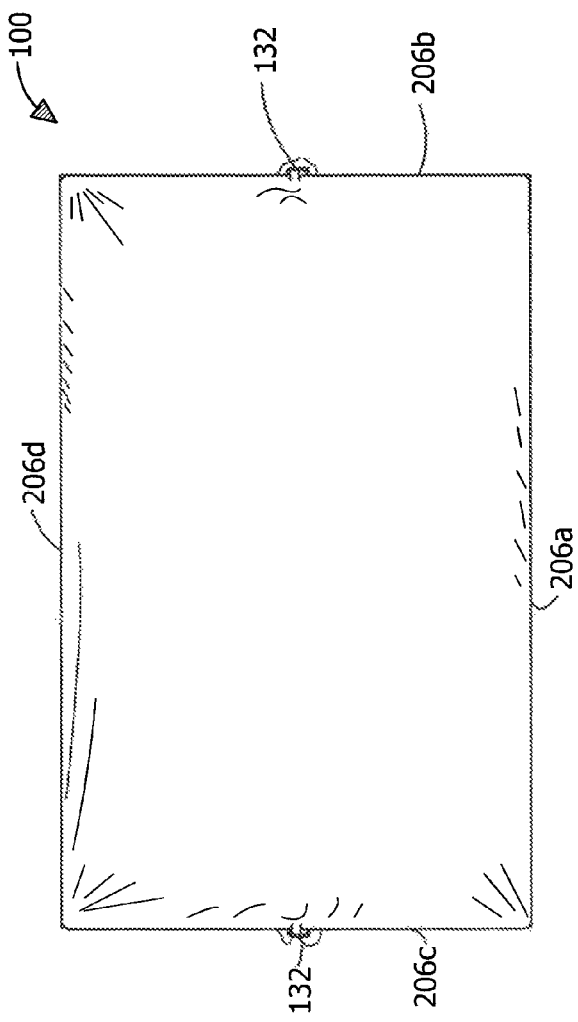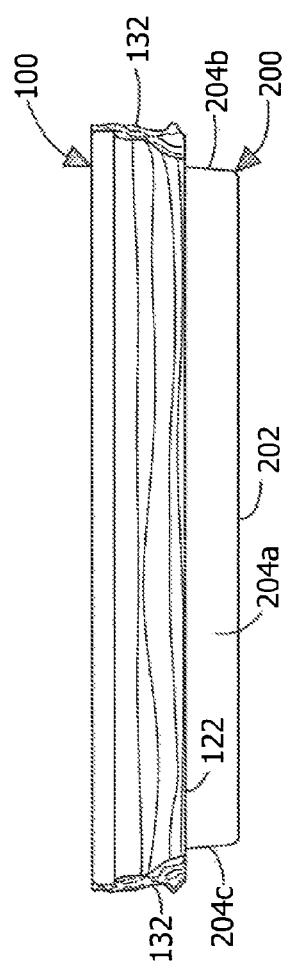

GUSSET TOP SIDE SEAL COVER
(AFTER SHRINK)

TOP GUSSET SQUARE TOP SIDE SEAL COVER
(UNFOLDED)

TOP GUSSET SQUARE TOP SIDE SEAL COVER
(SECTION VIEW)

TOP GUSSET SQUARE TOP SIDE SEAL COVER
( PRIOR TO SHRINK )

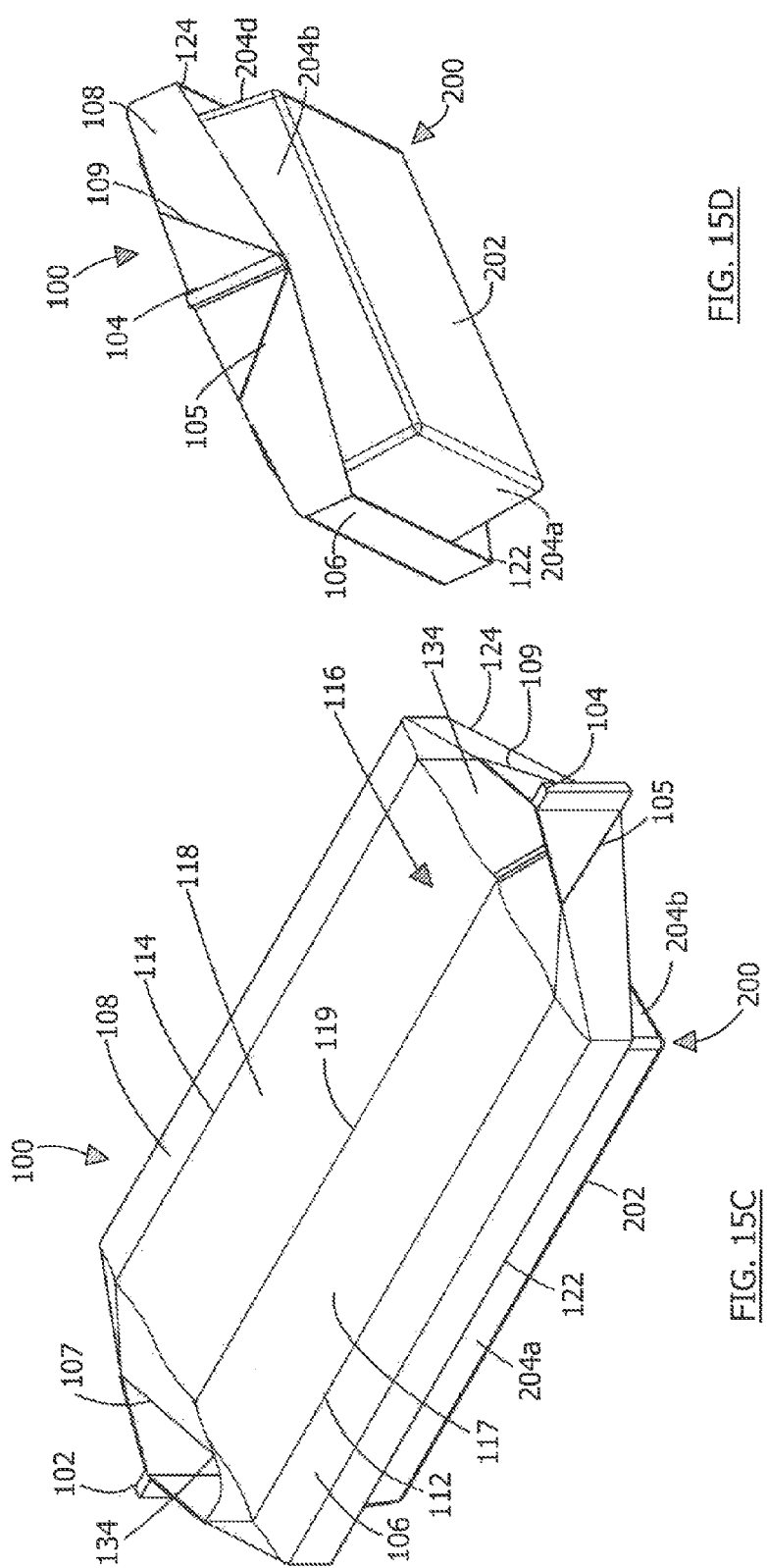

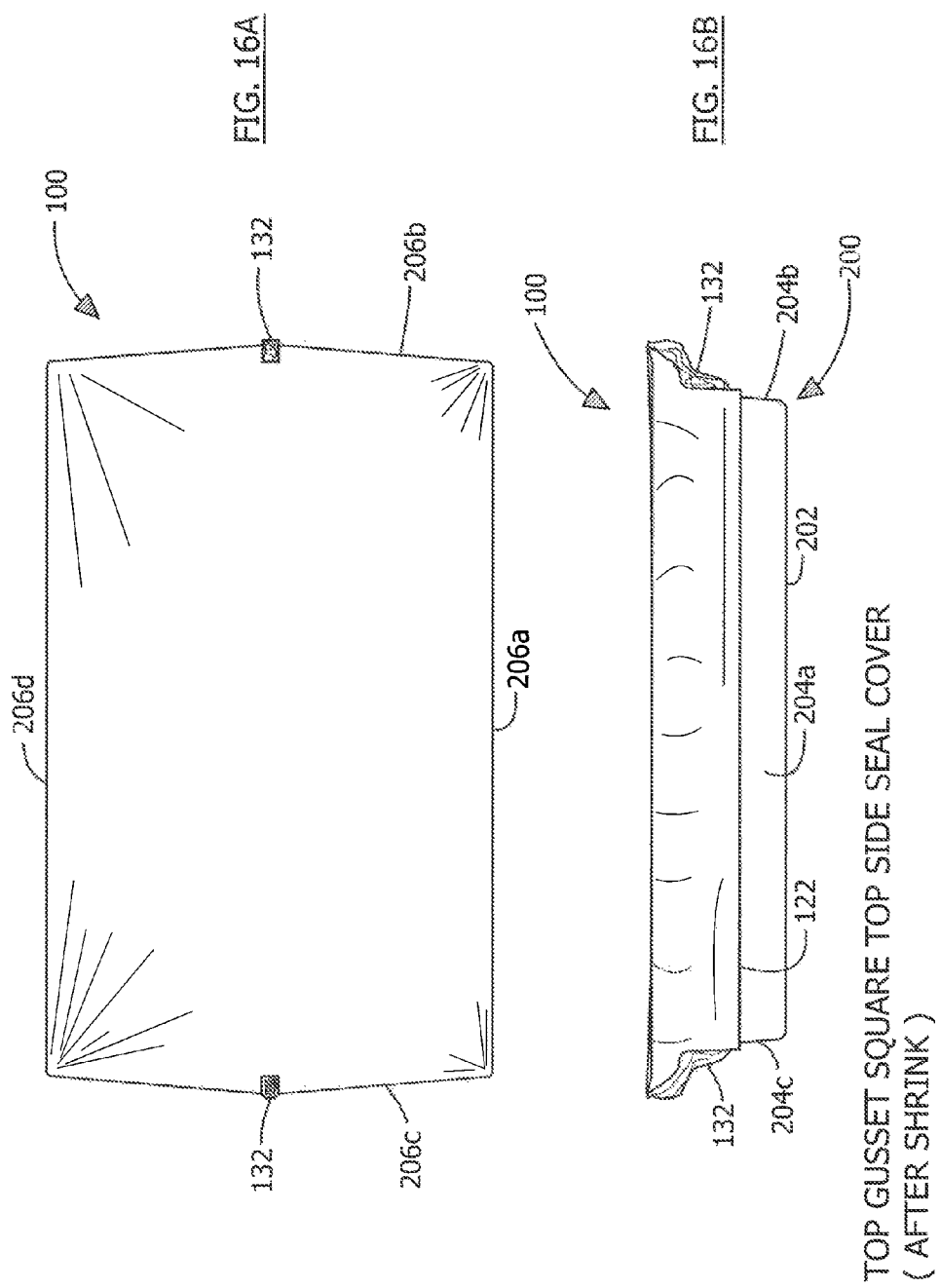

TOP GUSSET SQUARE TOP SIDE SEAL COVER
(AFTER SHRINK)

GUSSET TOP SIDE SEAL COVER
WITH SHORT SIDES
(UNFOLDED)

GUSSET TOP SIDE SEAL COVER
WITH SHORT SIDES
(SECTION VIEW)

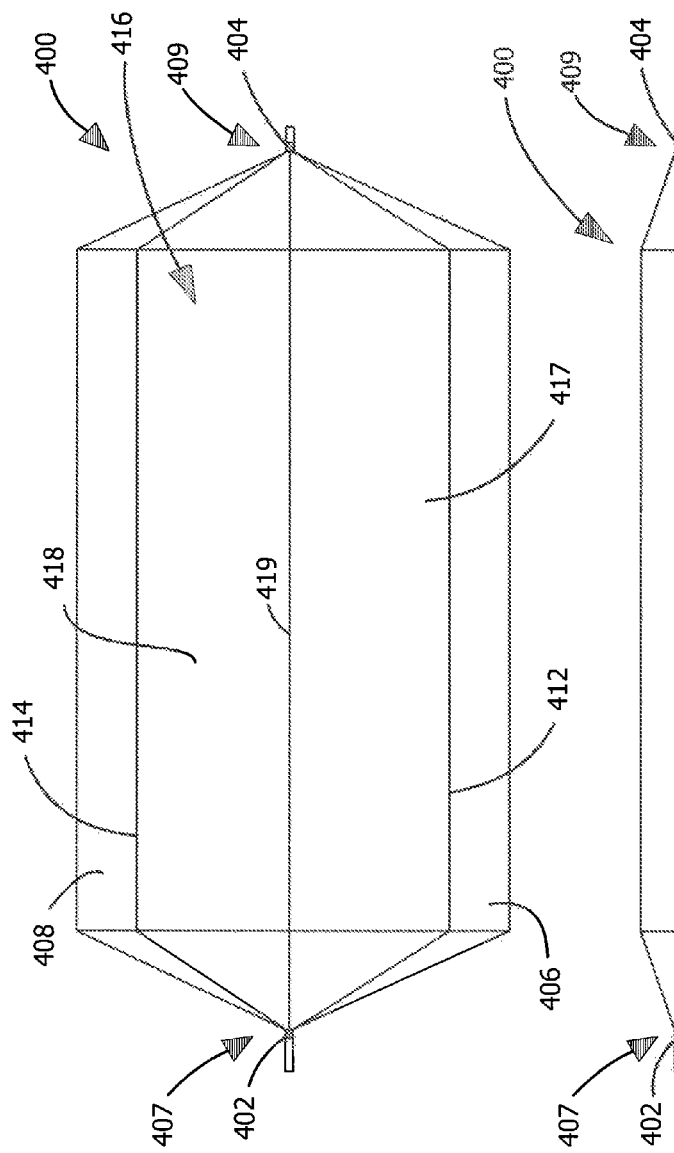
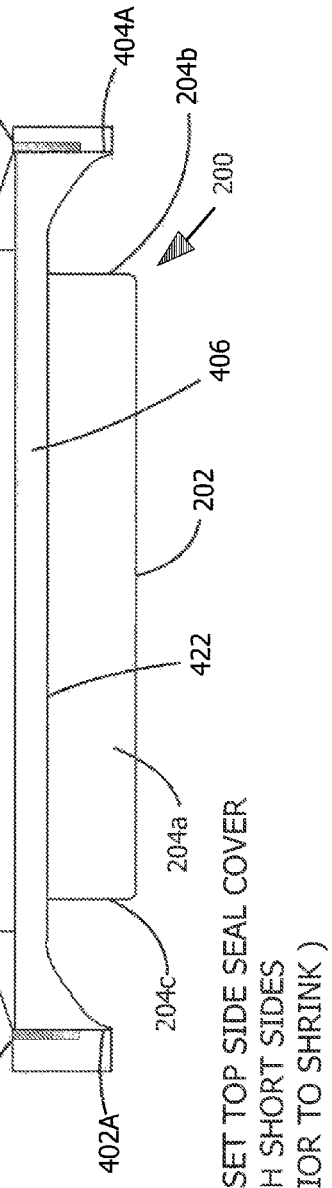
FIG. 23A
FIG. 23B
GUSSET TOP SIDE SEAL COVER
WITH SHORT SIDES
(PRIOR TO SHRINK)

GUSSET TOP SIDE SEAL COVER
WITH SHORT SIDES
(AFTER SHRINK)

COVERS AND CONTAINMENT SYSTEMS AND METHODS FOR FOOD SERVICE PANS

BACKGROUND

1. Field

The present disclosure relates to covers for food service pans and food containment systems. More specifically, the present disclosure relates to ovenable, heat-shrinkable covers for food service pans and food containment systems.

2. Background

Large food service pans are used for cooking, serving, and storing food in commercial food service establishments. These pans can be used in food servers, such as steam tables, buffet tables, chill tables, salad bars, chafing dishes, and the like. These pans can be used, for example, to cook and heat food, store food, and/or as transfer pans to carry large portions of food to and from a serving area. Conventional metal (e.g., stainless steel) food service pans are available in a variety of shapes, including rectangular and circular shapes. Such pans typically have a flange extending around a peripheral edge of the open pan top. The flange supports the pan in a steam or buffet table, provides a steam seal around a steam table, and offers a convenient lifting and carrying point. When used in a steam table, buffet table, salad bar, or the like, the pan body (e.g., the food receptacle portion) and flange are typically dimensioned so that the receptacle is received into an opening in the table or bar and supported by its flange resting upon the edges of the table or bar opening.

With the primary objective of moisture retention, various sheets, films, and covers have been used to cover such pans during food preparation, cooking, and storage. For example, paper sheets of cellulosic fibers have been used, as well as various plastic films. Thin metal foils, so-called tin foils, which are in reality thin sheets of aluminum, have also been used extensively for cooking, heating, and storing foods.

Difficulties with such conventional covers include tearing, breaking, leaking, and the inability to stack the pans in a refrigerator, walk-in box, or in transport. Also, many covers are not ovenable (i.e., the cover cannot be subjected to cooking temperatures without melting, cracking or contaminating food). For example, metal foils are notoriously easy to puncture and tear (e.g., by serving utensils). Further, metal foils are opaque and do not allow easy viewing of the contents of the container. They also cannot be heated in a microwave oven. In addition, sheets of metallic materials are relatively expensive as compared to other materials.

While paper sheets are useful for some culinary purposes, they are not ideal for pan covering because they are easily torn, are moisture and air permeable, and do not seal well around pans. In addition, paper sheets are typically not suitable for high temperature cooking applications.

Thermoplastic films, such as polyethylene films, offer greater durability. However, a problem with conventional films is that they typically do not grip or cling well to a pan edge, thereby allowing spillage, leakage, or spoilage. Furthermore, many thermoplastic films are not ovenable and, therefore, cannot be used when reheating or cooking food in the pan. Some films even emit dangerous chemicals when heated.

In an attempt to overcome the shortcomings of conventional coverings, industry practice has been to use multiple coverings to cover a single pan. For example, a layer of plastic film (for puncture and tear resistance) is wrapped over the pan, followed by a layer of foil to hold the plastic film in place. This practice increases the time and expense for covering a pan. And still, the negative features of the plastic film and the foil are not overcome.

Still another disadvantage of these conventional pan covering methods is frequent worker injury. Covering a pan typically involves pulling a plastic sheet or metal foil from a roll and forcing the sheet or foil against a serrated metal cutter edge to remove a desired length of the plastic sheet or foil. When moving quickly, as workers in a commercial kitchen are often required to do, a worker can cut his or her finger or hand on the cutter edge. Such a cut is an undesirable incident in a food service environment.

Further, conventional pan covering methods do not provide a quick and simple way to remove the pan covering(s) from the pan. Often, multiple layers must be unwrapped, without an easy gripping point to remove the cover.

There is a need, therefore, for an improved food service pan cover. In particular, there is a need for a simple, flexible, replaceable, disposable, transparent, and durable pan cover having non-stick and high temperature attributes, that conforms to the shape, size, and contour of the pan or food receptacle. Further, there is a need for pan covers that provide moisture retention, reduce leakage, and allow multiple pans to be stacked on top of each other.

BRIEF SUMMARY

The present disclosure is directed to covers for food service pans, food containment systems, and methods of covering and sealing food pans. In certain embodiments, the food pan cover can be a bag-like structure having a closed top, an open bottom, and two sealed sides. In other embodiments, the cover is pre-shaped by, for example, thermoforming to fit a pan.

In certain embodiments, the food pan cover can be formed from a single layer of polymeric material that is heat shrinkable. The polymeric material is ovenable and safe for contact with food at cooking temperatures. Preferably, the cover can withstand a temperature of at least about 400 degrees Fahrenheit for a minimum of about two hours, preferably about four hours, and most preferably at least about six hours. Preferably, the cover is at least partially transparent, such that the contents of the pan can be viewed through the cover.

Various embodiments of the cover are disclosed. Certain embodiments provide manufacturing advantages (e.g., lower cost) while others provide better sealing to a particular pan shape and size.

In certain embodiments, the food pan cover has a closed top end having a first top edge and an open bottom end having a first bottom edge and a second bottom edge. The food pan cover also has a first side seal extending from the top end to the bottom end and a second side seal extending from the top end to the bottom end. A first lateral wall is formed by the first top edge, first bottom edge, first side seal, and second side seal. A second lateral wall is formed by the first top edge, second bottom edge, first side seal, and second side seal.

In certain embodiments, the first lateral wall and the second lateral wall meet at the first top edge. The food pan cover also includes a first angled seal extending from the first side seal to the first top edge and a second angled seal extending from the second side seal to the first top edge.

In certain embodiments, the top end can include a second top edge. The first lateral wall is formed by the first top edge, first bottom edge, first side seal, and second side seal. The second lateral wall is formed by the second top edge, second bottom edge, first side seal, and second side seal.

In a preferred embodiment, the food pan cover can include a gusset. The gusset is formed between the first top edge and the second top edge. The gusset includes a fold line, a first top panel bounded by the first top edge and the fold line, and a second top panel bounded by the second top edge and the fold line. In certain embodiments, each of the first and second lateral walls include a first angled seal extending from the first side seal to the respective top edge and a second angled seal extending from the second side seal to the respective top edge.

In certain embodiments, the food pan cover can have a closed top end having a first top edge and a second top edge and an open bottom end having a first bottom edge and a second bottom edge. The food pan cover has a first side seal extending from the top end to the bottom end and a second side seal extending from the top end to the bottom end. A first lateral wall is formed by the first top edge, first bottom edge, first side seal, and second side seal. A second lateral wall is formed by the second top edge, second bottom edge, first side seal, and second side seal. A gusset is formed between the first top edge and the second top edge.

In certain embodiments, the gusset includes a fold line, a first top panel bounded by the first top edge and the fold line, and a second top panel bounded by the second top edge and the fold line. The gusset can expand to increase a distance between the first lateral wall and the second lateral wall. In certain embodiments, the first top panel is approximately equal in size to the first lateral wall, and the second top panel is approximately equal in size to the second lateral wall.

In another preferred embodiment, a food pan cover formed from a heat-shrinkable material has a first end, a second end, a first side panel having a first top edge and a first bottom edge, and a second side panel having a second top edge and a second bottom edge. A gusset can be formed between the first side panel and the second side panel. The gusset can have a third bottom edge, a first gusset panel delineated by the first end, the second end, the first top edge, and the third bottom edge, and a second gusset panel delineated by the first end, the second end, the second top edge, and the third bottom edge. A width of the first gusset panel can be greater than a width of the first side panel, and a width of the second gusset panel can be greater than a width of the second side panel. The food pan cover can be used with a pan (e.g., a Gastronorm pan) to form a food containment system.

In certain embodiments, the food pan cover can have a first side seal extending along a portion of the first end, sealing together a portion of each of the first side panel, the second side panel, the first gusset panel, and the second gusset panel. The food pan cover can also have a second side seal extending along a portion of the second end, sealing together a portion of each of the first side panel, the second side panel, the first gusset panel, and the second gusset panel.

In certain embodiments, the first end can have a sealed portion and an unsealed portion. After heat-shrinking the food pan cover over the opening of a pan, the unsealed portion of the first end can form a first flap and a second flap. The unsealed portion of the first end can also have a first tab. The second end can also have a sealed portion and an unsealed portion. After heat-shrinking the food pan cover over the opening of a pan, the unsealed portion of the second end can form a third flap and a fourth flap. The unsealed portion of the second end can also have a second tab.

In certain embodiments, at least one of the first or second side seal extends along more than half the width of the first or second side panel. In other embodiments, at least one of the first or second side seal extends along less than half the width of the first or second side panel. In certain embodiments, at least one of the first or second side seal extends along approximately half the width of the first or second side panel.

In certain embodiments, at least one of the first or second side seal extends along more than half the width of the first or second gusset panel. In other embodiments, at least one of the first or second side seal extends along less than half the width of the first or second gusset panel. In certain embodiments, at least one of the first or second side seal extends along approximately half the width of the first or second gusset panel.

In certain embodiments, the width of the first side panel is approximately equal to the width of the second side panel. The width of the first gusset panel can be approximately equal to the width of the second gusset panel.

The heat-shrinkable material can be a polymeric material. In certain embodiments, the heat-shrinkable material can be a mono-layer film having a thickness of about one mil. In certain embodiments, the heat-shrinkable material is capable of withstanding a temperature of at least about 400 degrees Fahrenheit for at least about two hours.

In certain embodiments, the food pan cover is sized to fit about a pan, for example, a Gastronorm pan. The pan can have a bottom surface and one or more side walls extending upwardly from the bottom surface, each side wall having a top edge defining a top opening of the pan. In certain embodiments, at least a portion of the first side panel of the food pan cover can be located outside a first side wall of the pan and at least a portion of the second side panel can be located outside a second side wall of the pan, when the pan cover is covering the pan. The pan cover can be configured to shrink when heat is applied to the pan cover so that the pan cover engages a peripheral lip of the pan at the top opening to cover and seal the top opening.

In certain embodiments, the Gastronorm pan can be a shallow, medium, or deep third pan. The food pan cover can have a length between 19 and 21 inches, and the width of the first and second gusset panels can be between 5 and 7 inches. In certain embodiments, the width of the first and second side panels can be between 4 and 5 inches.

In certain embodiments, the polymeric material of the food pan cover can be substantially clear (i.e., transparent or translucent) to allow the contents of a pan to be viewed through the cover. Labeling information (e.g., contents, date, etc.) can be written on the cover, for example, with a marker or felt-tipped pen.

In certain embodiments, the food pan cover can include a first angled seal extending from the first side seal to the first top edge and a second angled seal extending from the second side seal to the first top edge. The food pan cover also includes a third angled seal extending from the first side seal to the second top edge and a fourth angled seal extending from the second side seal to the second top edge.

In certain embodiments, the food pan cover can be tinted different colors using pigments, dyes, etc. The coloring can be for aesthetic purposes or to provide a color coding system to indicate, for example, the type of food contained within the pan. The cover can be translucent even with the coloring, so that the contents of the pan can still be viewed.

In certain embodiments, various information can be printed on the covers. For example, the name, address, or website of a kitchen or restaurant can be printed on the covers. Expiration dates, food preparation instructions, bar codes, etc. can also be printed on the covers. In addition, or as an alternative, labels can be applied to the covers with similar information.

In certain embodiments, the covers can include perforations. The perforations can be small pin holes that allow steam to escape from the pan during cooking, which can help control the quality of the food being cooked. For example, when cooking meat, allowing steam to escape can help the meat properly brown.

In certain embodiments, tear locations can be added to the covers. For example, one or more tear notches can be located along the sides, edges, or seals of the cover. Tear notches can make it easier to remove the cover from the pan after cooking, without requiring the use of a knife, scissors, etc.

In another embodiment, the food pan cover is pre-formed into a shape to match the shape of the open end of a pan to be covered.

Food containment systems comprising a pan and a cover are also contemplated and disclosed herein. For example, a food containment system can include a Gastronorm pan and a food pan cover configured to fit about the Gastronorm pan. The food pan cover can be formed from a heat-shrinkable polymeric material capable of withstanding a temperature of at least about 400 degrees Fahrenheit for at least about two hours. The food pan cover can have a first end, a second end, a first side panel having a first top edge and a first bottom edge, and a second side panel having a second top edge and a second bottom edge. A gusset can be formed between the first side panel and the second side panel. The gusset can have a third bottom edge, a first gusset panel delineated by the first end, the second end, the first top edge, and the third bottom edge, and a second gusset panel delineated by the first end, the second end, the second top edge, and the third bottom edge. A width of the first gusset panel can be greater than a width of the first side panel, and a width of the second gusset panel can be greater than a width of the second side panel.

In certain embodiments of the food containment systems, the food pan cover can have a first side seal extending along a portion of the first end, sealing together a portion of each of the first side panel, the second side panel, the first gusset panel, and the second gusset panel. The food pan cover can also have a second side seal extending along a portion of the second end, sealing together a portion of each of the first side panel, the second side panel, the first gusset panel, and the second gusset panel. The first and second ends can each have a sealed portion and an unsealed portion. After heat-shrinking the food pan cover over the opening of a pan, the unsealed portion of the first end forms a first flap, a second flap, and a first tab, and the unsealed portion of the second end forms a third flap, a fourth flap, and a second tab.

Methods of sealing a food pan are also contemplated and disclosed herein. A food pan, for example, any of the food pans described herein, can be covered with a pan cover, for example, any of the pan covers disclosed herein. The method can also include heating the food, for example, at a temperature of at least about 300 degrees Fahrenheit. In certain embodiments, the food pan cover can be removed by applying a force to (e.g., pulling on) at least one of the first flap, second flap, third flap, fourth flap, first tab, or second tab of the cover.

BRIEF DESCRIPTION OF THE DRAWINGS

The accompanying figures, which are incorporated herein, form part of the specification and illustrate embodiments of the present disclosure. Together with the description, the figures further serve to explain the principles of and to enable a person skilled in the relevant arts to make and use the disclosed embodiments. These figures are intended to be illustrative, not limiting. Although the disclosure is generally described in the context of these embodiments, it should be understood that it is not intended to limit the scope of the disclosure to these particular embodiments. In the drawings, like reference numbers indicate identical or functionally similar elements.

FIG. 3A illustrates a top view of a food pan cover on a food pan prior to heat-shrinking, according to an embodiment disclosed herein.

FIG. 3B illustrates a side view of a food pan cover on a food pan prior to heat-shrinking, according to an embodiment disclosed herein.

FIGS. 3C and 3D illustrate perspective views of a food pan cover on a food pan prior to heat-shrinking, according to an embodiment disclosed herein.

FIGS. 4C and 4D illustrate perspective views of a food pan cover on a food pan after heat-shrinking, according to an embodiment disclosed herein.

FIGS. 7C and 7D illustrate perspective views of a food pan cover on a food pan prior to heat-shrinking, according to an embodiment disclosed herein.

FIG. 8A illustrates a top view of food pan cover on a food pan after heat-shrinking, according to an embodiment disclosed herein.

FIG. 8B illustrates a side view of a food pan cover on a food pan after heat-shrinking, according to an embodiment disclosed herein.

FIGS. 8C and 8D illustrate perspective views of a food pan cover on a food pan after heat-shrinking, according to an embodiment disclosed herein.

FIG. 11A illustrates a top view of a food pan cover on a food pan prior to heat-shrinking, according to an embodiment disclosed herein.

FIG. 11B illustrates a side view of a food pan cover on a food pan prior to heat-shrinking, according to an embodiment disclosed herein.

FIG. 12A illustrates a top view of food pan cover on a food pan after heat-shrinking, according to an embodiment disclosed herein.

FIG. 12B illustrates a side view of a food pan cover on a food pan after heat-shrinking, according to an embodiment disclosed herein.

FIGS. 15C and 15D illustrate perspective views of a food pan cover on a food pan prior to heat-shrinking, according to an embodiment disclosed herein.

FIG. 16A illustrates a top view of food pan cover on a food pan after heat-shrinking, according to an embodiment disclosed herein.

FIG. 16B illustrates a side view of a food pan cover on a food pan after heat-shrinking, according to an embodiment disclosed herein.

FIG. 23A illustrates a top view of a food pan cover on a food pan prior to heat-shrinking, according to an embodiment disclosed herein.

FIG. 23B illustrates a side view of a pan cover on a food pan prior to heat-shrinking, according to an embodiment disclosed herein.

DETAILED DESCRIPTION

Figure 1:
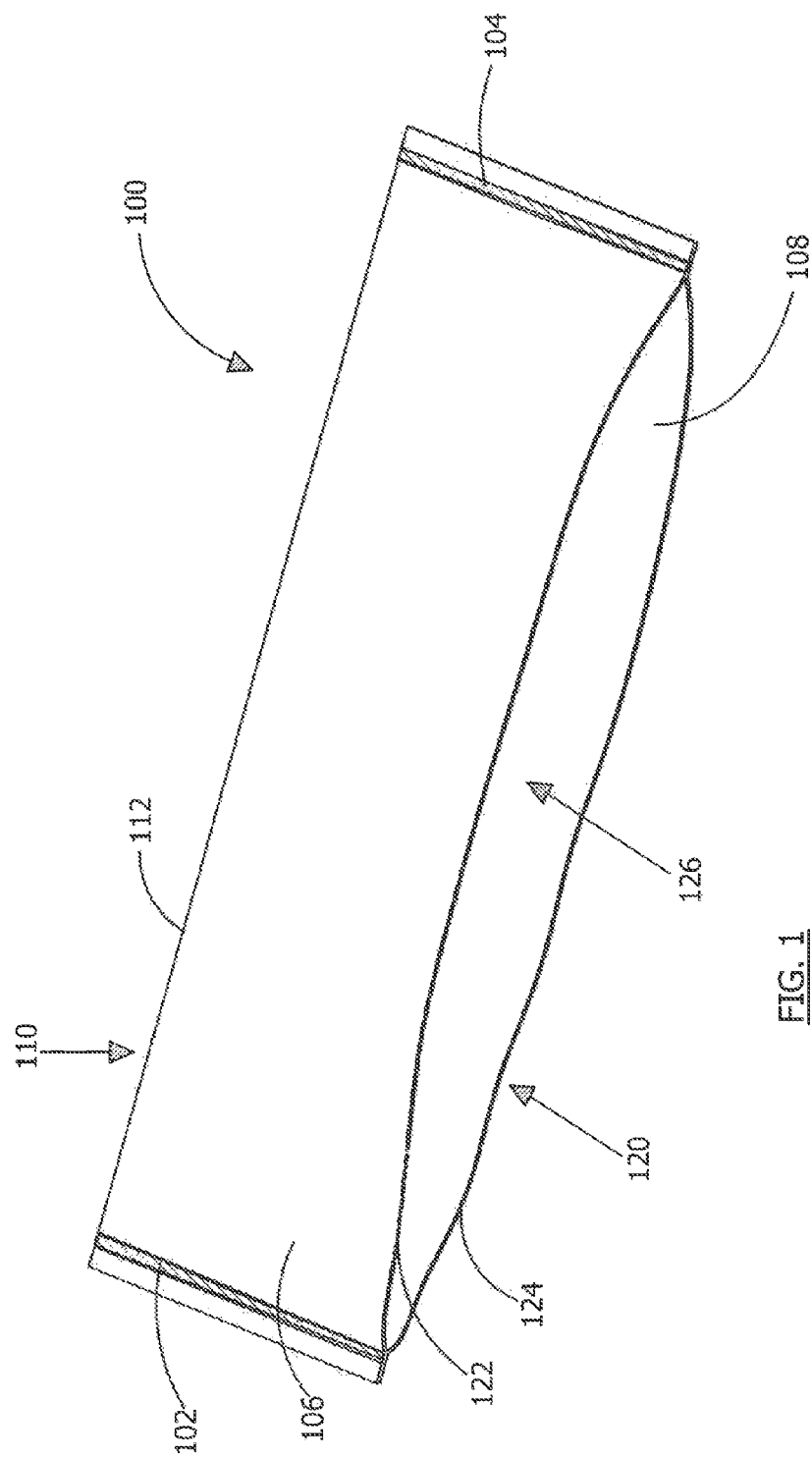
FIG. 1 illustrates a food pan cover, according to an embodiment disclosed herein.

Embodiments of the present disclosure will now be described in detail with reference to embodiments thereof as illustrated in the accompanying drawings, in which like reference numerals are used to indicate identical or functionally similar elements. References to "one embodiment", "an embodiment", "some embodiments", "in certain embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present disclosure. Other suitable modifications and adaptations of the variety of conditions and parameters normally encountered in the field, and which would be apparent to those skilled in the art, are within the spirit and scope of the disclosure.

The covers disclosed herein can be used for covering and sealing food pans such as Gastronorm pans (see, e.g., the European Committee for Standardization standard sizes for containers used in the catering industry as specified in the EN 631 standard). The covers can also be used in conjunction with other food containment systems, or any other type of containment system (e.g., product storage).

Table 1 shows examples of standard Gastronorm pan sizes used in commercial and industrial kitchens.

TABLE 1

Standard Size Pans.

| Pan Description | Pan Size (L × W) | Pan Depth (H) |
| --- | --- | --- |
| Half Pan-Shallow | 12.8" × 10.4" | 2.5" |
| Half Pan-Medium & Deep | 12.8" × 10.4" | 4" & 6" |
| Third & Quarter Pan-Medium & Deep | 12.8" × 6.9" | 4" & 6" |
| Third & Quarter Pan-Shallow | 12.8" × 6.9" | 2.5" |
| Sixth Pan | 6.4" × 6.9" | 6" |
| Hotel Pan-Shallow & Medium | 12.8" × 20.8" | 2.5" & 6" |
| Hotel Pan-Deep | 12.8" × 20.8" | 6" |
| 2 Quart Round | | 8.2" |
| 4 Quart Round | | 8.2" |
| 6 & 7 Quirt Round | | 8.2" |
| 9 & 11 Quart Round | | 8.2" |
| Bun Sheet Pan | 18.5" × 26.5" | n/a |
| G.I. Roasting Pan | 20" × 17" | 6.5" |
| Large Roasting Pan | 25.5" × 17.5" | 4" |

While the embodiments of the invention find particular application and advantage when used with a Gastronorm cooking pan, the covers and containment systems disclosed herein are not so limited. For example, the covers disclosed herein can be used with pots, trays, roasting pans, baking dishes, containers, kettles, bowls, slow cookers, crock pots, electric roasters, etc., in a variety of shapes and sizes. Preferably, covers can be manufactured for standard cooking, transportation, and storage devices used in the food service industry. Alternatively, custom shapes and sizes for covers can be manufactured and used. It is understood that the covers disclosed herein can also be utilized in non-cooking applications, for example, covering trays used in dry heat sterilizing of medical equipment.

Figure 17:
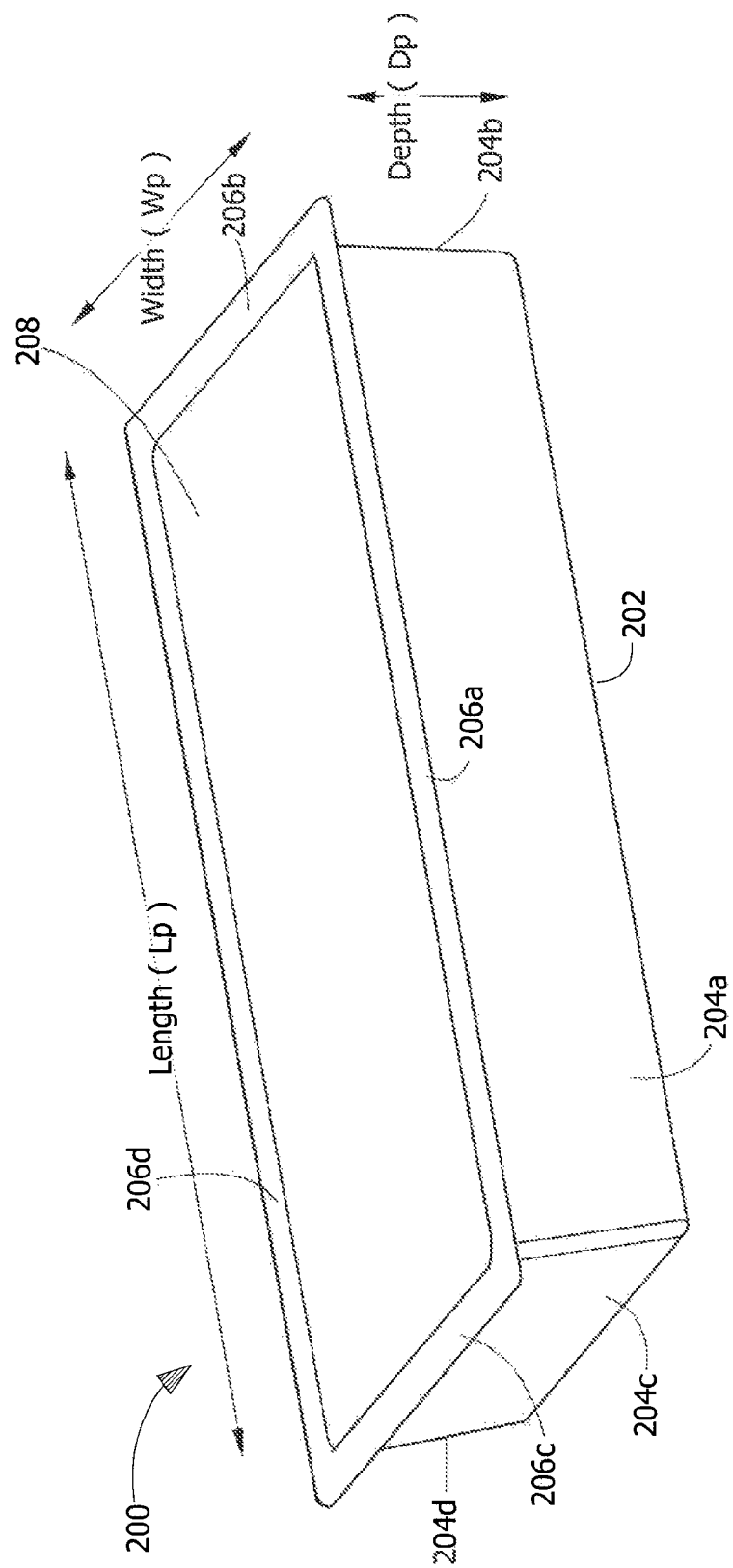
FIG. 17 illustrates a pan, according to an embodiment disclosed herein.
Figure 18:
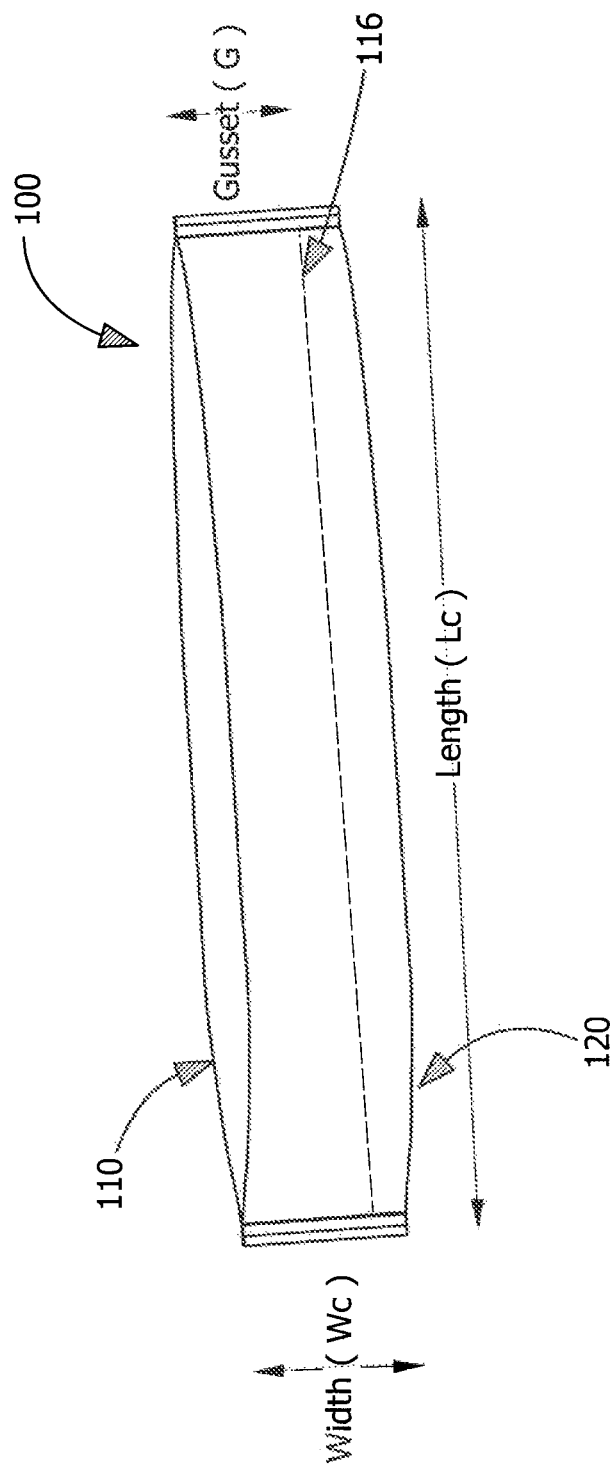
FIG. 18 illustrates a food pan cover, according to an embodiment disclosed herein.

In certain disclosed embodiments, the cover is in the shape of a shallow bag. In use, the cover is placed over a food-filled pan. An example pan 200 is shown in FIG. 17. An example cover 100, folded in a flat or co-planar configuration, is shown in FIG. 18. Pan 200 and various structural embodiments of cover 100 are described in detail herein. Prior to that detailed discussion, example sizes of pan 200 and cover 100 as well as example materials and properties of cover 100 are discussed.

Cover 100 is constructed with dimensions suitable for a particular size or range of sizes of pan 200. FIG. 17 shows for pan 200 a pan length ($L_P$), a pan width ($W_P$), and a pan depth ($D_P$). FIG. 18 shows for cover 100 a cover length ($L_C$), a cover width ($W_C$), and a gusset width (G). In an embodiment, the following guidelines may be used to select a cover size for use with a particular pan size. For example, for a particular pan, cover length ($L_C$) should be at least slightly longer than the sum of the pan's length ($L_P$) and width ($W_P$). For example, the cover length ($L_C$) can be approximately one (1) inch greater than the sum of the pan's length ($L_P$) and width ($W_P$). This can allow the cover to fit well about the pan while still allowing easy application of the cover around the pan.

Certain embodiments of cover 100 include a gusset 116 having a gusset width (G). In certain embodiments, gusset width (G) can be approximately half of pan width ($W_P$). Preferably, cover width ($W_C$) is greater than gusset width (G). For example, cover width ($W_C$) can be approximately one half (½) inch greater than gusset width (G). Among other advantages, a larger cover width facilitates cutting bottom end 120 during manufacture of cover 100 without inadvertent cutting of gusset 116.

Table 2 shows examples of pan cover dimensions for a pan cover that can be used with the standard Gastronorm pan sizes indicated.

TABLE 2

| Pan Description | Gastronorm Pan Dimensions $L_P \times W_P \times D$ | Pan Cover Dimensions $L_C \times W_C \times G$ |
| --- | --- | --- |
| Third Pan-Shallow | 12.8" × 6.9" × 2.5" | 20" × 4" × 3.5" |
| Third Pan-Medium | 12.8" × 6.9" × 4" | 20" × 4" × 3.5" |
| Third Pan-Deep | 12.8" × 6.9" × 6" | 20" × 4" × 3.5" |
| Half Pan-Shallow | 12.8" × 10.4" × 2.5" | 24" × 5.5" × 5" |
| Half Pan-Medium | 12.8" × 10.4" × 4" | 24" × 5.5" × 5" |
| Half Pan-Deep | 12.8" × 10.4" × 6" | 24" × 5.5" × 5" |
| Hotel Pan-Shallow | 20.8" × 12.8" × 2.5" | 35" × 5.5" × 5" or 35" × 7" × 6.5" |
| Hotel Pan-Medium | 20.8" × 12.8" × 4" | 35" × 5.5" × 5" or 35" × 7" × 6.5" |
| Hotel Pan-Deep | 20.8" × 12.8" × 6" | 35" × 5.5" × 5" or 35" × 7" × 6.5" |

By way of example, the sum of the shallow half pan's length ($L_P$=12.8") and width ($W_P$=10.4") is 23.2", which is 0.8" less than the pan cover's length ($L_C$=24"). In the case of the deep hotel pan, dimensions for the pan cover are preferably 35"×7"×6.5". However, due to size constraints of certain commercially available machinery, cover dimensions of 35"× 5.5"×5" may be more easily manufactured. The inventors have found such smaller dimensions to be acceptable for the indicated pan sizes. Similar manufacturing constraints may occur with other pan types as well, and pan cover dimensions can be altered accordingly.

In certain embodiments, the covers disclosed herein can be made from one or more plastic materials. In certain embodiments, the covers can be made from a polymer (e.g., polyester) or polymer blend. More specifically, in certain embodiments, the covers can be made from a thermoplastic elastomer. In certain embodiments, the covers can be made from other materials (e.g., nylon) or a composite material. In a preferred embodiment, the covers can be substantially translucent so that the contents of a covered pan can be viewed through the cover.

A specific example of a material suitable for the cover of the various embodiments is MQ501, a monolayer film manufactured by M&Q Packaging Corporation of Schuylkill Haven, Pa. MQ501 includes a homopolymer polyester resin, a polyester elastomer resin, and an antiblock concentrate. The polyester elastomer resin provides impact resistance to make the film more durable and prevent tears and punctures. The antiblock concentrate prevents the film material from sticking to itself. In particular, MQ501 includes Auriga 5800, a homopolymer polyester film resin manufactured by Auriga Polymers/Indorama Ventures of Spartanburg, S.C.; Arnitel EM630, a polyester elastomer resin manufactured by DSM Engineering Plastics (http://www.dsm.com); and Eastapak 9663E0003, an antiblock concentrate manufactured by Voridian (Eastman) of Gaston, S.C. A specific formulation includes 74.4% Auriga 5800, 24.8% Arnitel EM630, and 0.8% Eastapak 9663E0003. In other formulations, the amount of Arnitel EM630 can range from about 18% to about 25%.

Another example of a material suitable for the cover of the various embodiments is MQ520, a monolayer film manufactured by M&Q Packaging Corporation of Schuylkill Haven, Pa. MQ520 includes a modified copolyester resin, a polyester elastomer resin, and an antiblock concentrate. In particular, MQ520 includes Auriga 8001E, a modified copolyester film resin manufactured by Auriga Polymers/Indorama Ventures of Spartanburg, S.C.; Arnitel ECO L-X07110, a polyester elastomer resin manufactured by DSM; and Eastapak 9921G0019, an antiblock concentrate manufactured by Voridian (Eastman) of Gaston, S.C. A specific formulation includes 80% Auriga 8001E, 18% Arnitel ECO L-X07110, and 2% Eastapak 9921G0019.

An important aspect of embodiments of the present invention is that the covers of the various disclosed embodiments are formed from or include a heat-shrinkable material. That is, when the material is subjected to a temperature above a certain threshold temperature, the material shrinks or contracts. Generally, the threshold temperature is between the glass transition temperature and the melting point of the material. Shrink properties can be imparted by orienting the material as is well known in the relevant art and would be understood by a person of skill in the relevant art. Both of example films MQ501 and MQ520 are heat shrinkable films. In the context of the embodiments described herein, shrinkage will cause a cover to tightly conform to the edges or sides of a pan to seal the contents therein and prevent leakage.

Covers can be designed to shrink in a lengthwise ($L_C$) or width ($W_C$) direction. Preferably, the covers are designed to shrink in both the lengthwise and widthwise directions. Both of example films MQ501 and MQ520 are heat shrinkable films that are oriented to shrink in both directions (i.e., dimensions). Covers can shrink between about 5% and about 50% in either or both directions. Preferably, the covers can shrink between about 20-30% in both directions.

After heat-shrinking, the covers form a rigid or semi-rigid surface (i.e., a surface under tension) across the pan top opening. Whereas traditional plastic films and foil are not sufficiently strong to prevent a stacked pan from falling into the bottom pan, the covers disclosed herein are strong enough to allow pans to be stacked on top of each other. This provides convenient, spacing-saving storage and transport.

Another important aspect of embodiments of the present invention is that the covers are "ovenable" to withstand reheating or cooking in a standard oven. Preferably, the covers can withstand a temperature of at least about 300 degrees Fahrenheit. More preferably, the covers can withstand a temperature of at least about 350 degrees Fahrenheit. Even more preferably, the covers can withstand a temperature of at least about 400 degrees Fahrenheit. Even more preferably, the covers can withstand a temperature of at least about 450 degrees Fahrenheit. Preferably, the covers can withstand these temperatures for 6 hours or more. Many commercially available plastic films cannot withstand these temperatures, particularly for such a long duration of time. In addition, it is preferable that the covers be approved by the U.S. Food and Drug Administration (FDA) or the applicable authority in another country of interest for contact with food at these temperatures. Specific tests, for example an extraction test, can be performed to determine the safety of a particular material at high temperatures.

To help control the quality of the food being cooked, the covers can also include perforations. The perforations can be, for example, small pin holes that allow steam to escape from the pan during cooking. For example, when cooking meat, allowing steam to escape can help the meat properly brown.

To facilitate removal of the cover after cooking, tear locations can be added to the covers. Tear notches can make it easier to rip the cover off the pan after cooking, without requiring the use of a knife, scissors, etc. For example, one or more tear notches can be located along first side seal 102, second side seal, 104, first bottom edge 122, and/or second bottom edge 124. Tear notches can be included at other locations on the cover as well. After removing the cover, the cover can be discarded. That is, in contrast to "permanent" metal or plastic lids, the covers disclosed herein can be thrown away.

In certain embodiments, the covers, formed from the films described herein, can have a thickness between about 0.2 and 5 mils. Preferably, the covers can have a thickness between about 0.8 and 1.5 mils. More preferably, the covers can have a thickness between about 0.9 and 1.0 mils. For example, a cover formed from MQ501 film can have a thickness of approximately 1 mil. It should be noted that after heat-shrinking, generally the disclosed films increase in thickness. For example, a cover using MQ501 that is approximately 1 mil thick prior to heat-shrinking may be approximately 2-3 mils after heat-shrinking, depending on the degree of shrinkage.

In certain embodiments, the covers can be formed from a multi-layer film. For example, a three layer film can be formed with two outer layers enclosing a middle layer. In an example embodiment, the outer layers can be a polyester elastomer (e.g., Arnitel ECO L-X07110 or Arnitel EM630) and the middle layer can be a homopolymer (e.g., Auriga 5800 or Auriga 8001E). In certain embodiments, one or more of the layers can be a blended material. For example, the middle layer can be a homopolymer and polyester elastomer blend (e.g., 75% Auriga 5800 and 25% Arnitel EM630). MQ120, manufactured by M&Q Packaging Corporation of Schuylkill Haven, Pa., is an example of such a multi-layer film.

A person skilled in the relevant art will understand that the examples set forth herein are representative and that other materials having suitable properties can be used to form cover 100 in accordance with the teachings set forth herein.

Examples of various embodiments of cover 100 are presented below. These examples are not exhaustive and are not meant to be limiting of the breadth and scope of the present invention. Rather, these examples are meant to illustrate the structure, function, features and operation of the invention. Each of these example embodiments may be manufactured from a variety of materials in a variety of sizes. As specific examples that the present inventor(s) expect to be commercially useful, any of the disclosed embodiments may be manufactured as: (Example 1) a 20"×4"×3.5" cover for a shallow third pan made from a single layer of MQ501 with a thickness of 1 mil; (Example 2) a 24"×5.5"×5" cover for a medium half pan made from a single layer of MQ520 with a thickness of 0.9 mils; or (Example 3) a 35"×5.5"×5" cover for a deep hotel pan made from a multilayer film (e.g., MQ120) having a thickness of 1.5 mils with top and bottom layers of Arnitel ECO L-X07110 and a middle layer of Auriga 5800 and Arnitel EM630.

Figure 2:
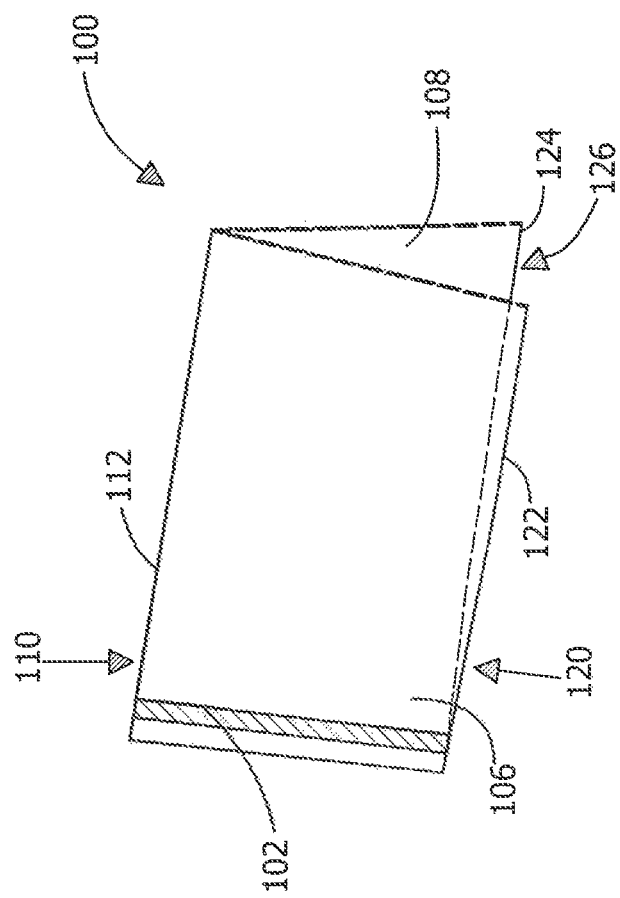
FIG. 2 illustrates a section view of a food pan cover, according to an embodiment disclosed herein.
Figure 4A:
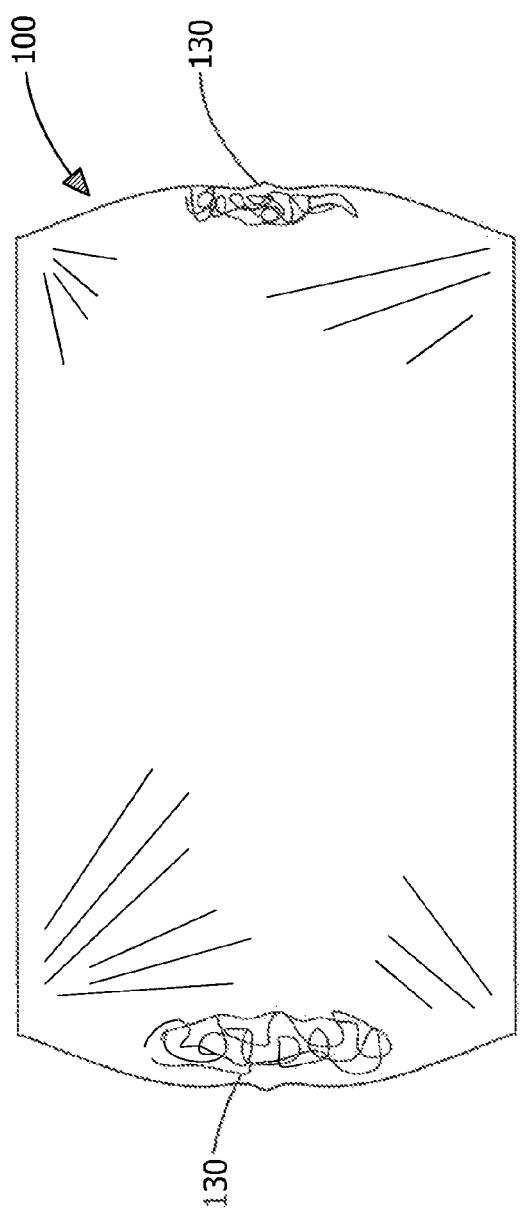
FIG. 4A illustrates a top view of food pan cover on a food pan after heat-shrinking, according to an embodiment disclosed herein.
Figure 4B:
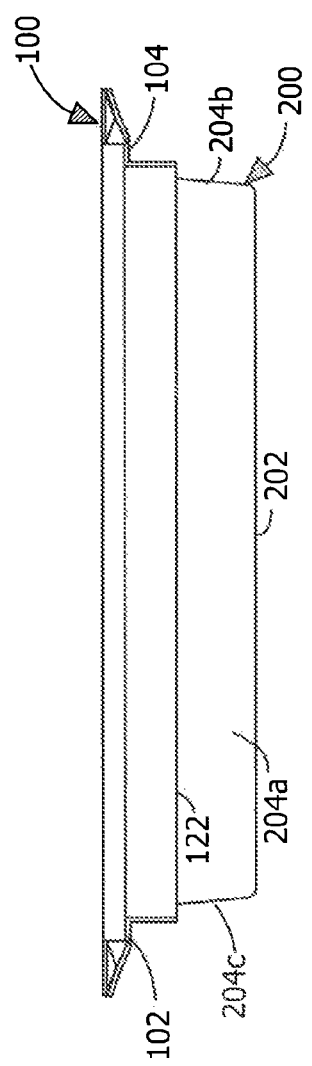
FIG. 4B illustrates a side view of a food pan cover on a food pan after heat-shrinking, according to an embodiment disclosed herein.

FIG. 1 illustrates cover 100, according to a first embodiment. FIG. 2 illustrates a section view of cover 100, according to the first embodiment. In certain embodiments, cover 100 can be formed from a single sheet of polymeric material. For example, the sheet of material can be folded in half and sealed on either side to form a closed top end, bottom opening, and two sealed sides. Any of the seals disclosed herein can be formed by heat or thermo-sealing, impulse-sealing, sonic-sealing, RF-sealing, or any other type of sealing. Other suitable techniques can be used to seal cover 100, such as bonding, stitching, adhesion, etc.

Cover 100 can include top end 110 having first top edge 112. In certain embodiments, cover 100 can include first side seal 102 and second side seal 104. Forming cover 100 in this manner can create bottom end 120, having first bottom edge 122, second bottom edge 124, and opening 126. First lateral wall 106 can be bounded by first side seal 102, second side seal 104, first top edge 112, and first bottom edge 122. Second lateral wall 108 can be bounded by first side seal 102, second side seal 104, first top edge 112, and second bottom edge 124.

FIGS. 3A-3D illustrate the first embodiment of cover 100 placed over pan 200, prior to heat-shrinking. Pan 200 can be made of any suitable material, for example, but not limited to, stainless steel, copper, aluminum, glass, ceramic, plastic, etc. As shown, for example in FIG. 17, pan 200 can include bottom panel 202 and side walls 204a, 204b, 204c, and 204d, which can extend upwardly from bottom panel 202. Each side wall 204a-d can terminate in a respective top edge 206a, 206b, 206c, and 206d. Top edges 206a-d can form pan opening 208. In certain embodiments, a flange can extend from top edges 206a-d. It is understood that pan 200 can be many other shapes and sizes.

As shown, for example, in FIGS. 3A and 3C, cover 100 can be placed over pan 200 such that first top edge 112 of cover 100 is located approximately at a midpoint of top edges 206b and 206c of pan 200. In certain embodiments, first top edge 112 can be off-center. In certain embodiments, first lateral wall 106 can extend outside side wall 204a and second lateral wall 108 can extend outside side wall 204d. Prior to heat-shrinking, cover 100 can form a triangular shape at opposite ends of pan 200, as it is fitted over pan 200. As shown, for example, in FIG. 3B, the excess material of cover 100 can extend beyond side walls 204b and 204c. It is understood that cover 100 can be placed over pan 200 in any other configuration or direction.

FIGS. 4A-4D illustrate the first embodiment of cover 100 after heat-shrinking cover 100 about pan 200. As shown, for example, in FIG. 4A, the first embodiment of cover 100 can sometimes have poor sealing areas 130 between cover 100 and pan 200. This can result in spillage, leakage, or spoiling of food contained in pan 200. Generally, heat-shrinking cover 100 can cause first bottom edge 122 and second bottom edge 124 to at least partially seal around side walls 204a-d of pan 200.

Figure 5:
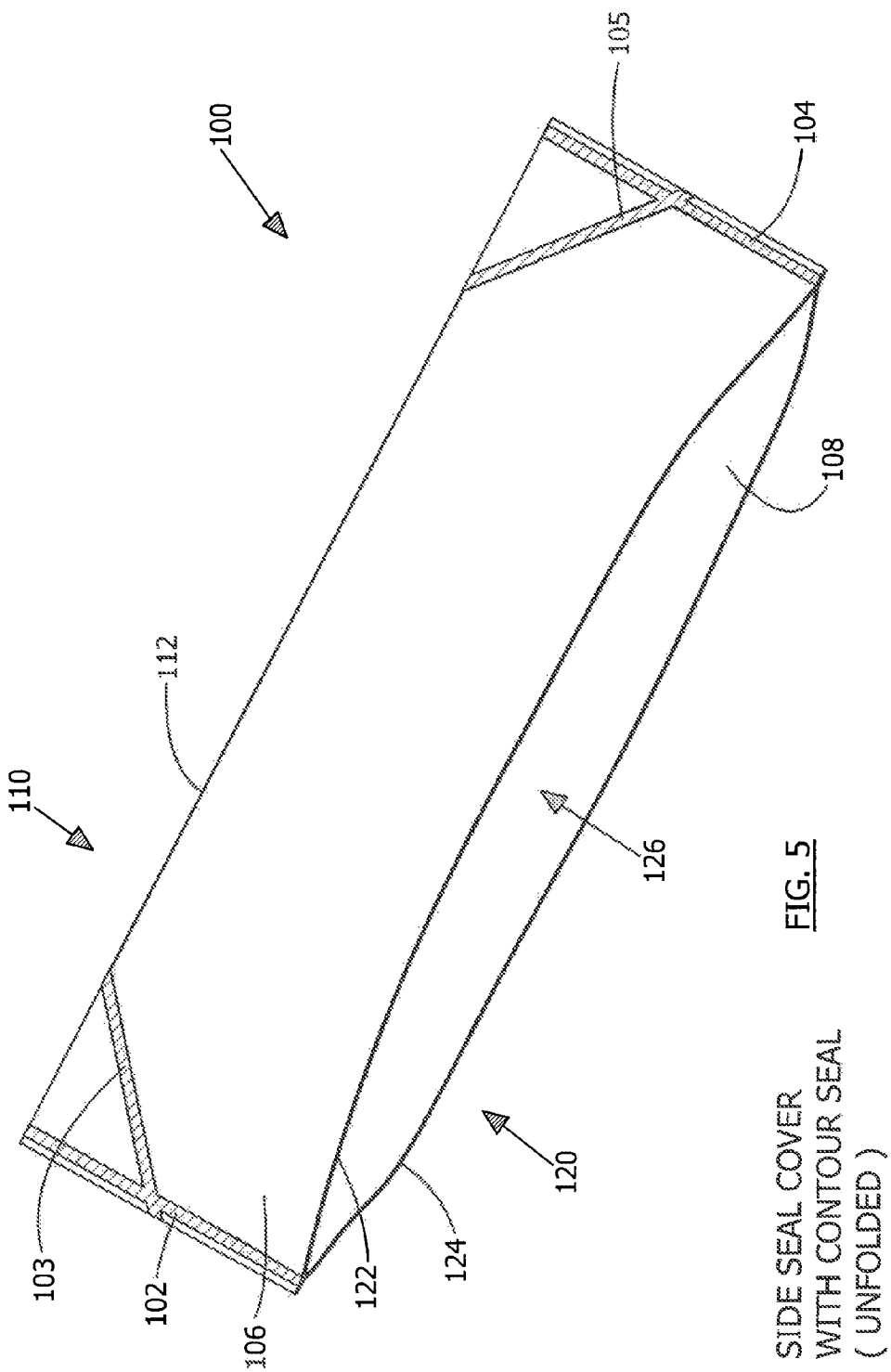
FIG. 5 illustrates a food pan cover, according to an embodiment disclosed herein.
Figure 6:
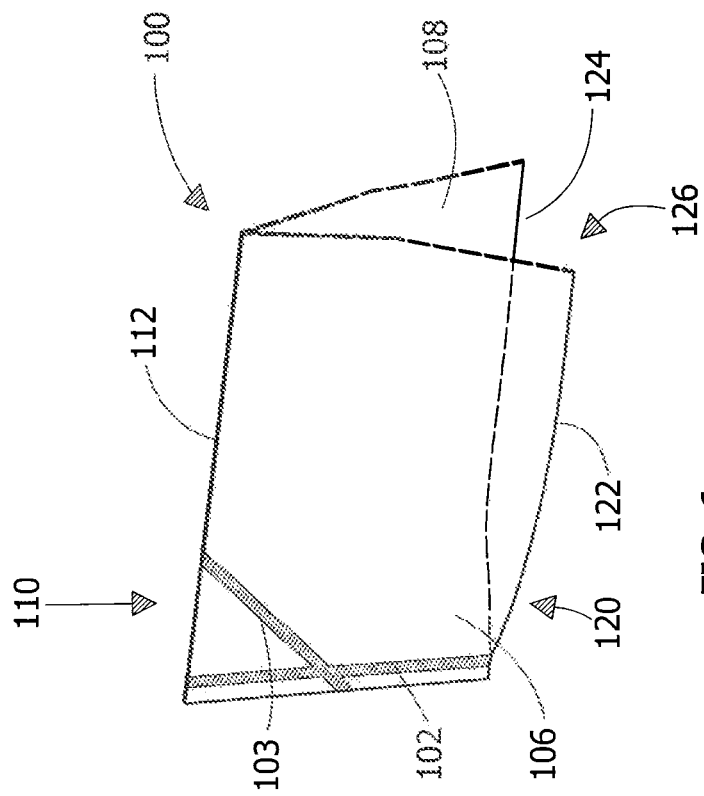
FIG. 6 illustrates a section view of a food pan cover, according to an embodiment disclosed herein.
Figure 7A:
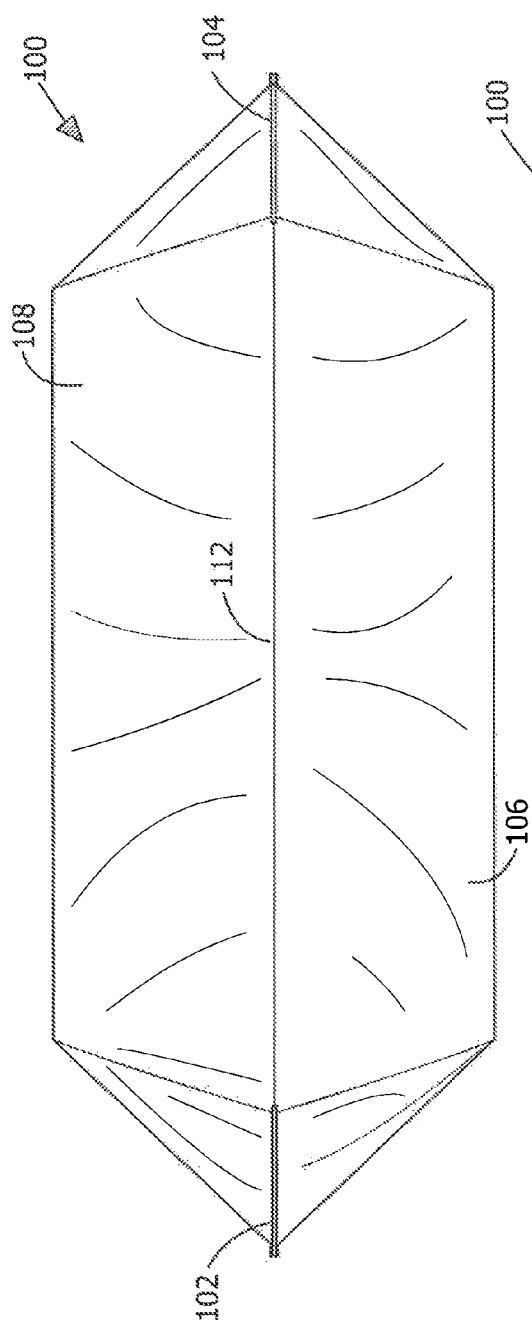
FIG. 7A illustrates a top view of a food pan cover on a food pan prior to heat-shrinking, according to an embodiment disclosed herein.
Figure 7B:
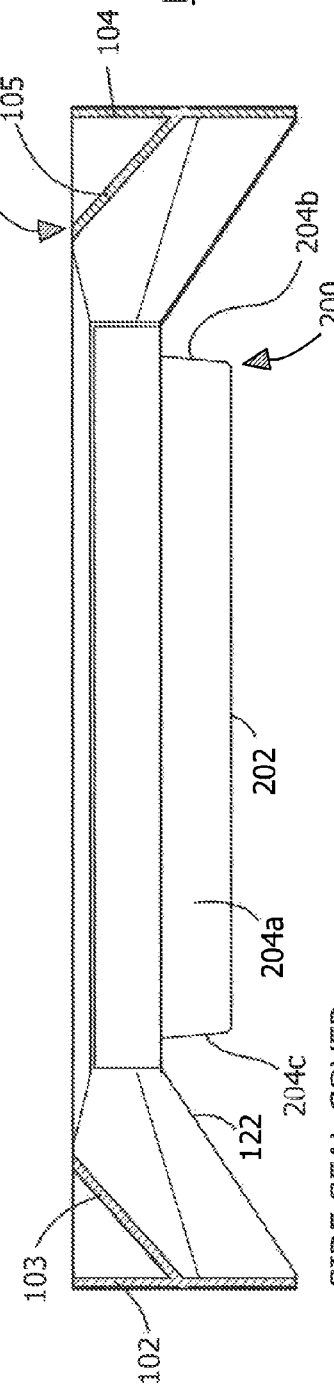
FIG. 7B illustrates a side view of a food pan cover on a food pan prior to heat-shrinking, according to an embodiment disclosed herein.

FIG. 5 illustrates cover 100, according to a second embodiment. FIG. 6 illustrates a section view of cover 100, according to the second embodiment. In addition to the features described above with respect to the first embodiment shown in FIG. 1, the second embodiment can include first angled seal 103 and second angled seal 105. First angled seal 103 and second angled seal 105 can be formed by any of the methods disclosed herein.

In certain embodiments, first angled seal 103 can extend from first side seal 102 to first top edge 112. Similarly, second angled seal 105 can extend from second side seal 104 to first top edge 112. First angled seal 103 and second angled seal 105 can seal first lateral wall 106 and second lateral wall 108 together along the respective seal. First angled seal 103 can have a first end located anywhere along first side seal 102 and a second end located anywhere along first top edge 112. Second angled seal 105 can have a first end located anywhere along second side seal 104 and a second end located anywhere along first top edge 112. First angled seal 103 and second angled seal 105 can create a more form-fitting shape for cover 100 when placed on pan 200, in comparison to the first embodiment.

FIGS. 7A-7D illustrate the second embodiment of cover 100 placed over pan 200, prior to heat-shrinking. As shown, for example, in FIG. 7A, because of first angled seal 103 and second angled seal 105, the excess portion of cover 100 extending beyond side walls 204b and 204c of pan 200 can be more tapered, in comparison to the first embodiment.

FIGS. 8A-8D illustrate the second embodiment of cover 100 after heat-shrinking. As shown, for example, in FIG. 8B, areas of excess material 132 can form at either end of cover 100 as it shrinks around pan 200. As shown, for example, in FIG. 8D, first bottom edge 122 and second bottom edge 124 can form a seal around side walls 204a-d of pan 200. Generally, the second embodiment can form a tighter seal between cover 100 and pan 200 in comparison to the first embodiment.

Figure 9:
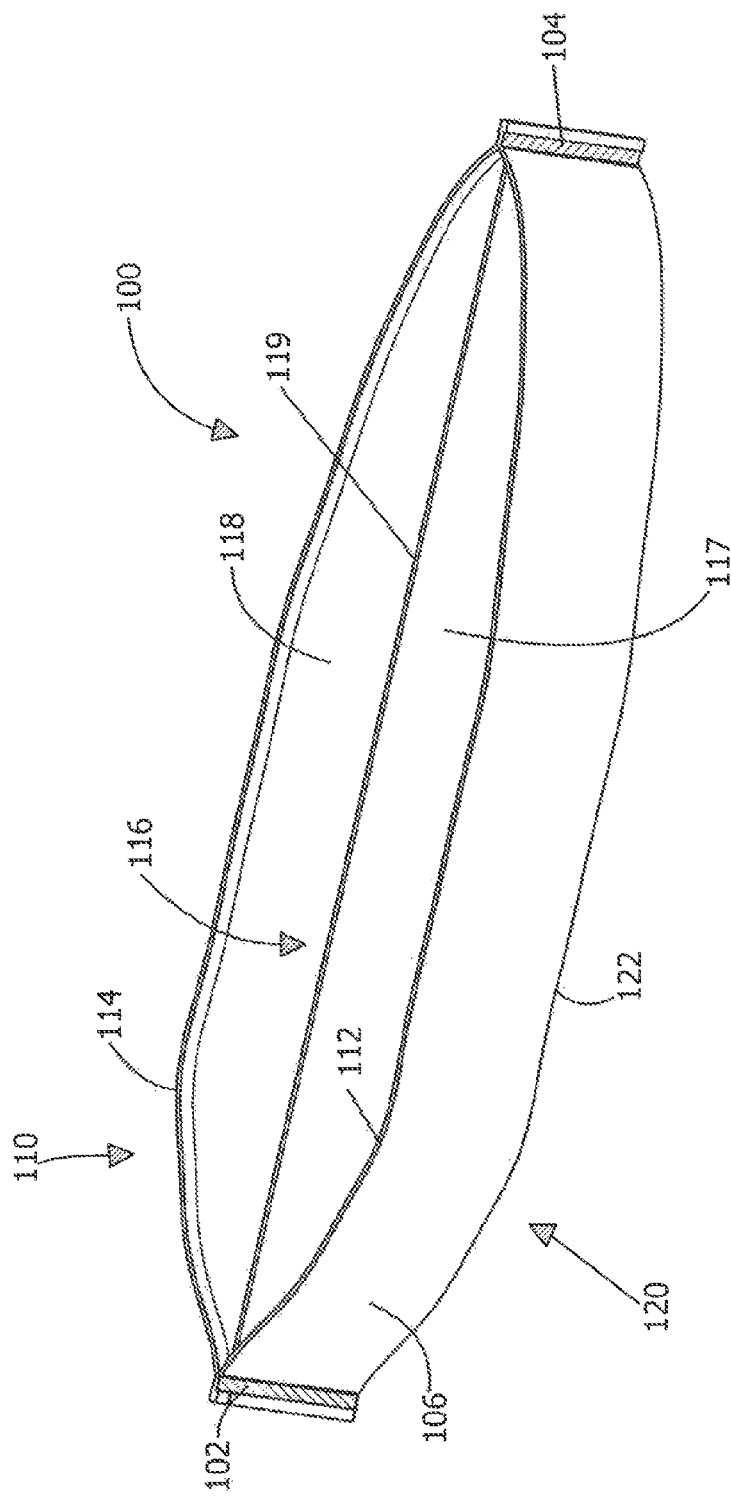
FIG. 9 illustrates a food pan cover, according to an embodiment disclosed herein.
Figure 10:
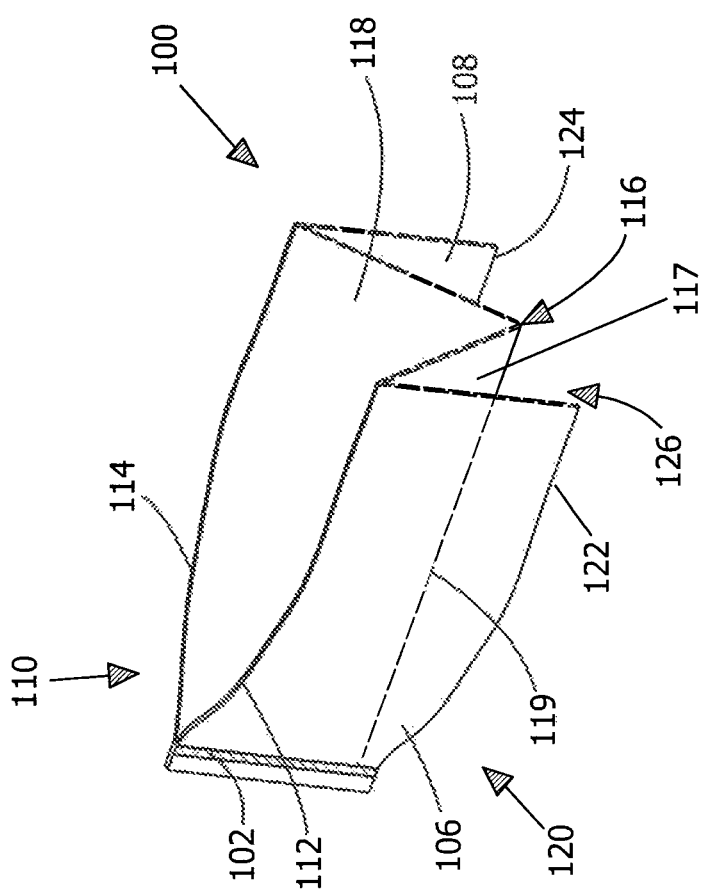
FIG. 10 illustrates a section view of a food pan cover, according to an embodiment disclosed herein.
Figure 11D:
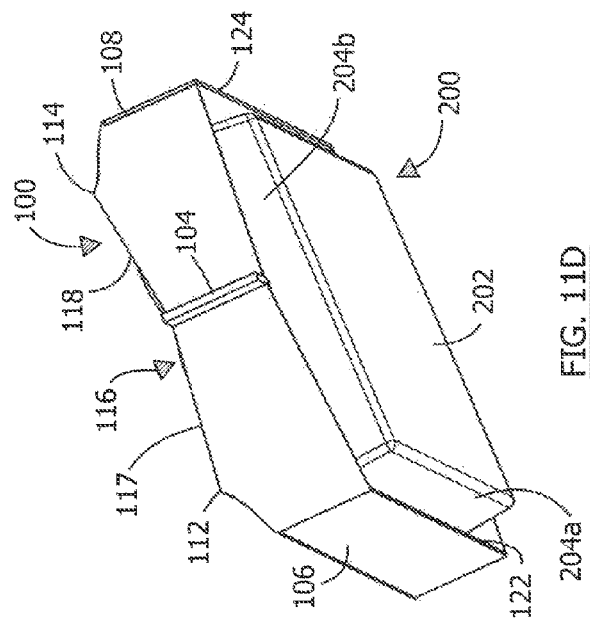
FIGS. 11C and 11D illustrate perspective views of a food pan cover on a food pan prior to heat-shrinking, according to an embodiment disclosed herein.
Figure 11C:
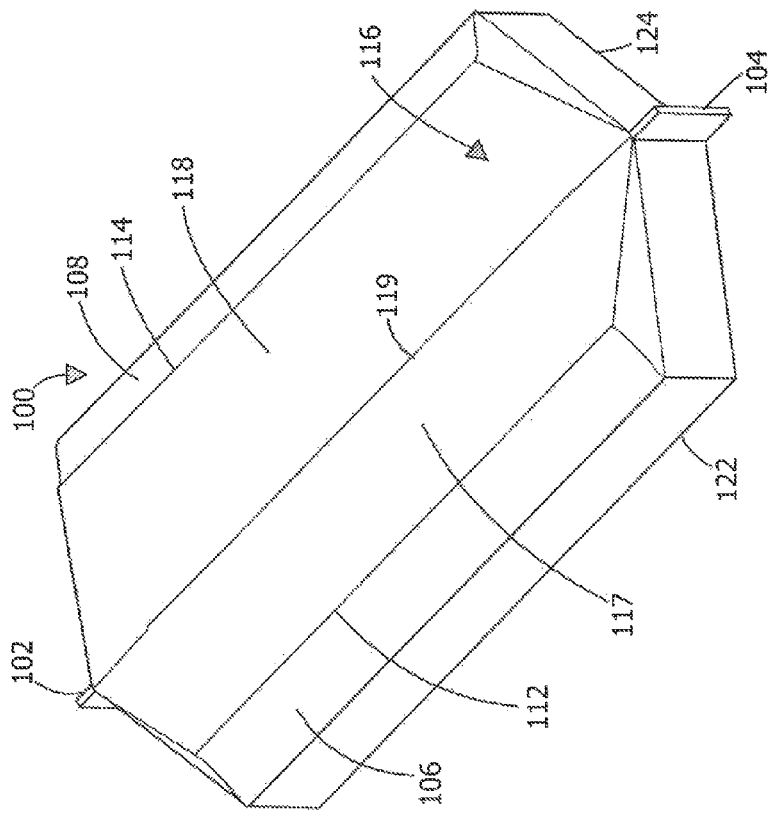
Figures 12C, 12D:
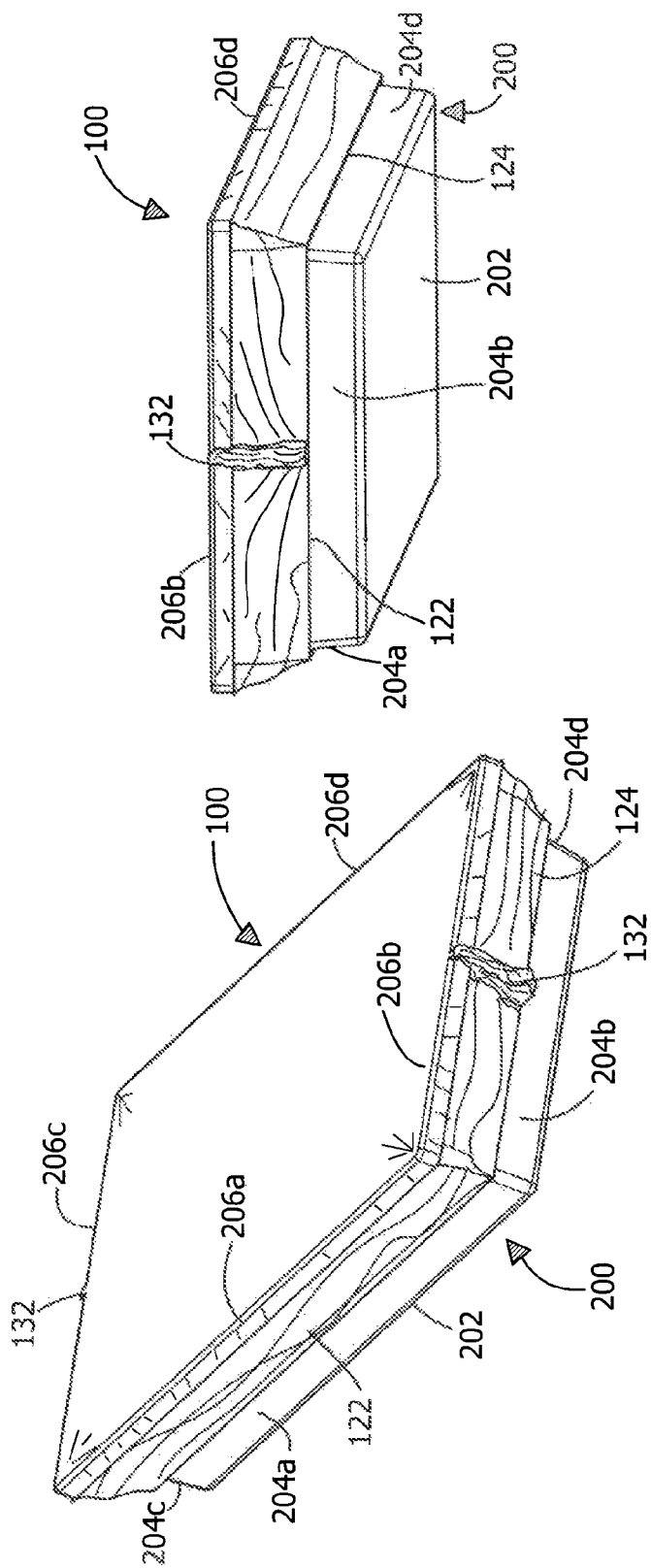
FIGS. 12C and 12D illustrate perspective views of a food pan cover on a food pan after heat-shrinking, according to an embodiment disclosed herein.

FIG. 9 illustrates cover 100, according to a third embodiment. FIG. 10 illustrates a section view of cover 100, according to the third embodiment. In certain embodiments, cover 100 can include top end 110, first side seal 102, second side seal 104, and bottom end 120. In certain embodiments, top end 110 can include first top edge 112 and second top edge 114. In certain embodiments, bottom end 120 can include first bottom edge 122, second bottom edge 124, and opening 126.

In this third embodiment, cover 100 includes gusset 116. Gusset 116 can extend between first top edge 112 and second top edge 114. In certain embodiments, gusset 116 can have fold line 119. In certain embodiments, fold line 119 can be located approximately half-way between first top edge 112 and second top edge 114. Gusset 116 can include first top panel 117 and second top panel 118. First top panel 117 can be bounded between first top edge 112 and fold line 119. Second top panel 118 can be bounded between second top edge 114 and fold line 119. In certain embodiments, gusset 116 can include more than one fold. For example, gusset 116 can have a W-shape, where each portion is the same length or different lengths.

As shown, for example, in FIG. 10, in certain embodiments, gusset 116 can form a V-shape between first lateral wall 106 and second lateral wall 108. In certain embodiments, first top panel 117 can be approximately equal in size to first lateral wall 106. Second top panel 118 can be approximately equal in size to second lateral wall 108. First top panel 117 and second top panel 118 can also be larger or smaller in size than first lateral wall 106 and second lateral wall 108, respectively.

FIGS. 11A-11D illustrate the third embodiment of cover 100 placed over pan 200, prior to heat-shrinking. As shown, for example, in FIG. 11A, fold line 119 of gusset 116 can be located approximately along a midpoint of side walls 204b and 204c of pan 200. In certain embodiments, fold line 119 can be located off-center. As shown, for example, in FIG. 11D, first top panel 117 and second top panel 118 of gusset 116 can extend only part way between a center of pan 200 and side walls 204a and 204d. In certain embodiments, first top panel 117 and/or second top panel 118 can extend to or beyond side walls 204a and 204d of pan 200. In certain embodiments, first lateral wall 106 and second lateral wall 108 can extend over top edges 206a and 206d of pan 200, and down along side walls 204a and 204d of pan 200.

FIGS. 12A-12D illustrate the third embodiment of cover 100, after heat-shrinking. As shown, for example, in FIGS. 12A and 12B, some excess material 132 can form along side walls 204b and 204c. Generally, the third embodiment of cover 100 can provide a tighter seal between cover 100 and pan 200 in comparison to the first and second embodiments of cover 100. As shown, for example, in FIGS. 12C and 12D, a tight seal can be formed between first bottom edge 122 and side walls 204a-c, and between second bottom edge 124 and side walls 204b-d.

Figure 13:
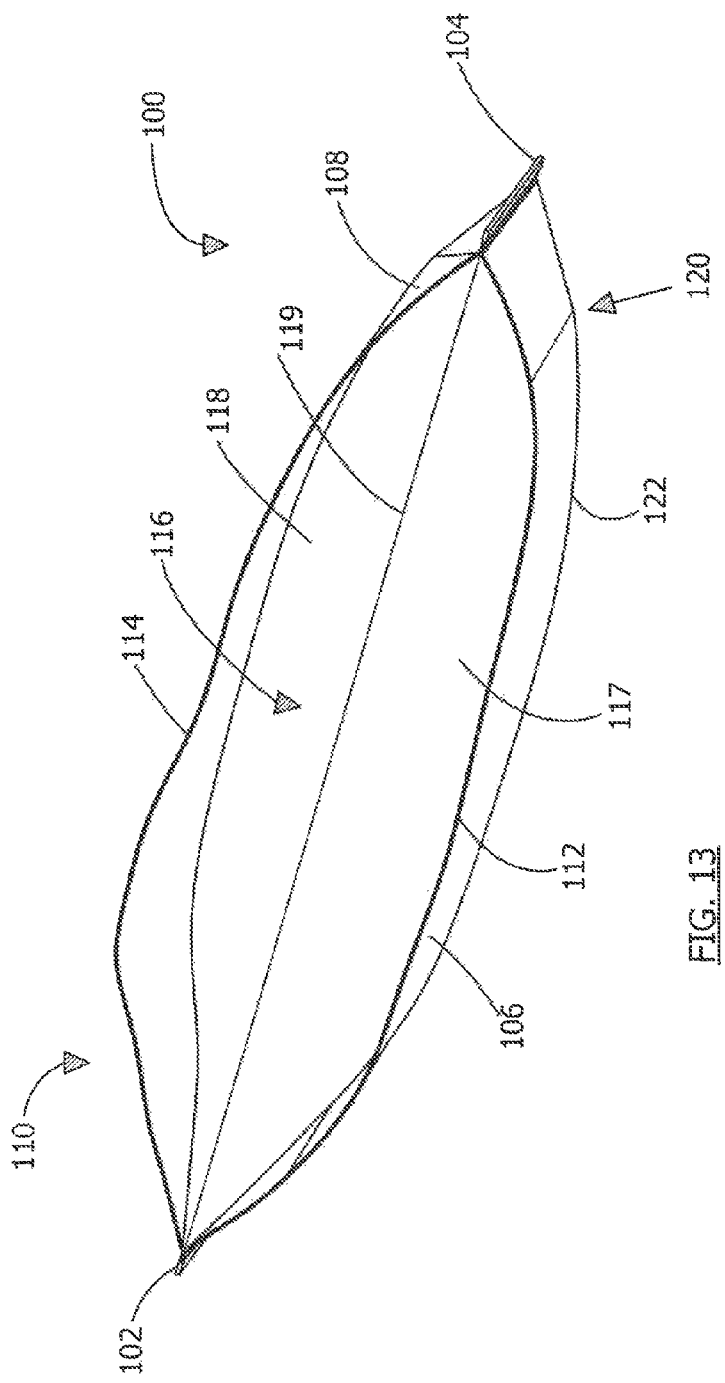
FIG. 13 illustrates a food pan cover, according to an embodiment disclosed herein.
Figure 14:
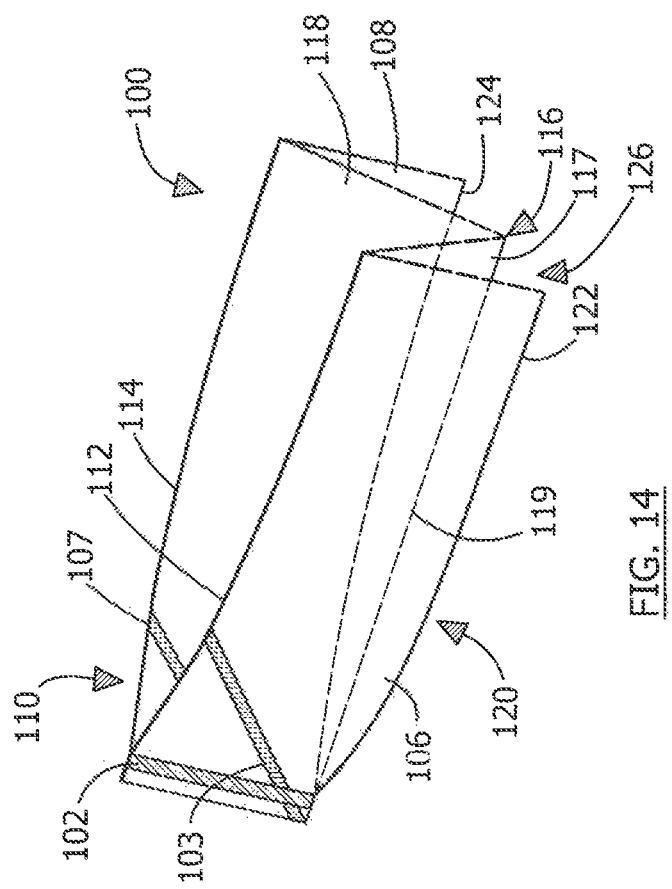
FIG. 14 illustrates a section view of a food pan cover, according to an embodiment disclosed herein.
Figure 15A:
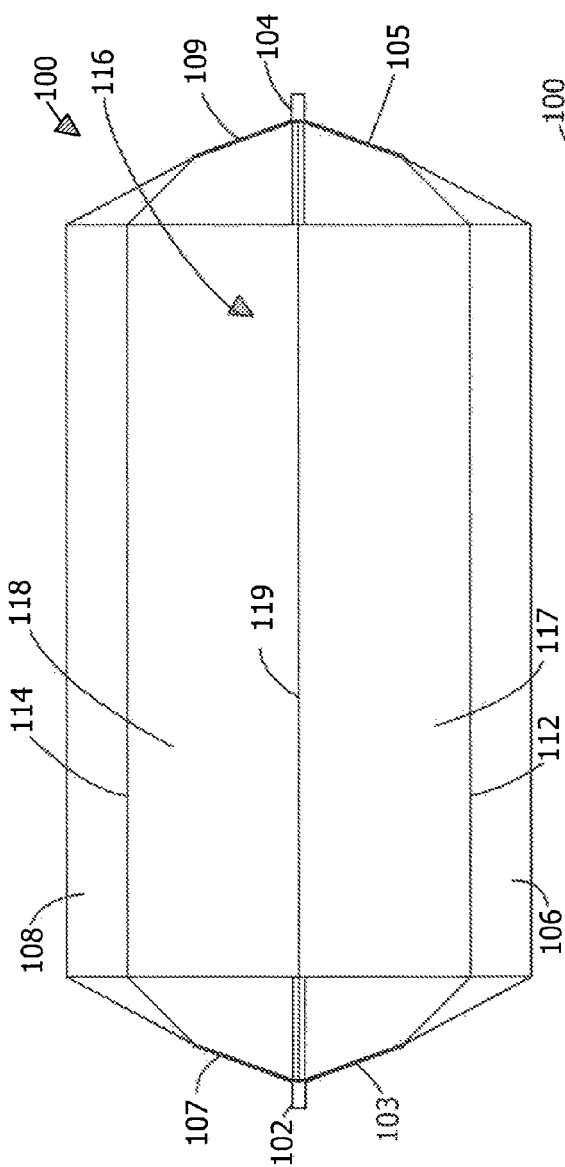
FIG. 15A illustrates a top view of a food pan cover on a food pan prior to heat-shrinking, according to an embodiment disclosed herein.
Figure 15B:
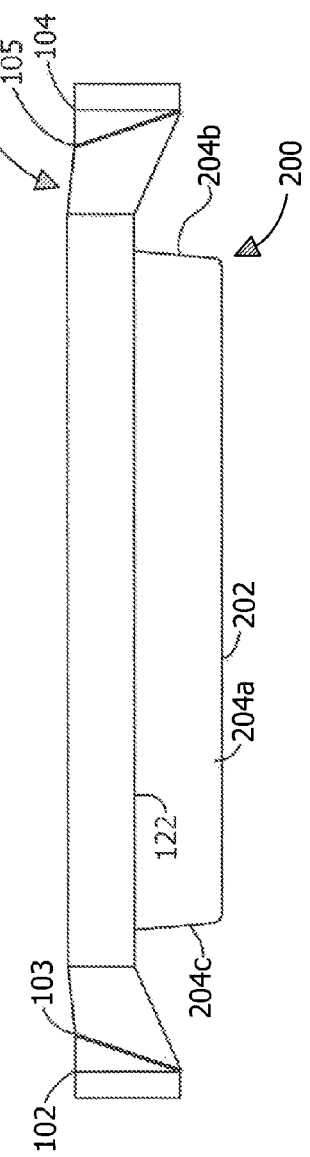
FIG. 15B illustrates a side view of a food pan cover on a food pan prior to heat-shrinking, according to an embodiment disclosed herein.
Figures 16C, 16D:
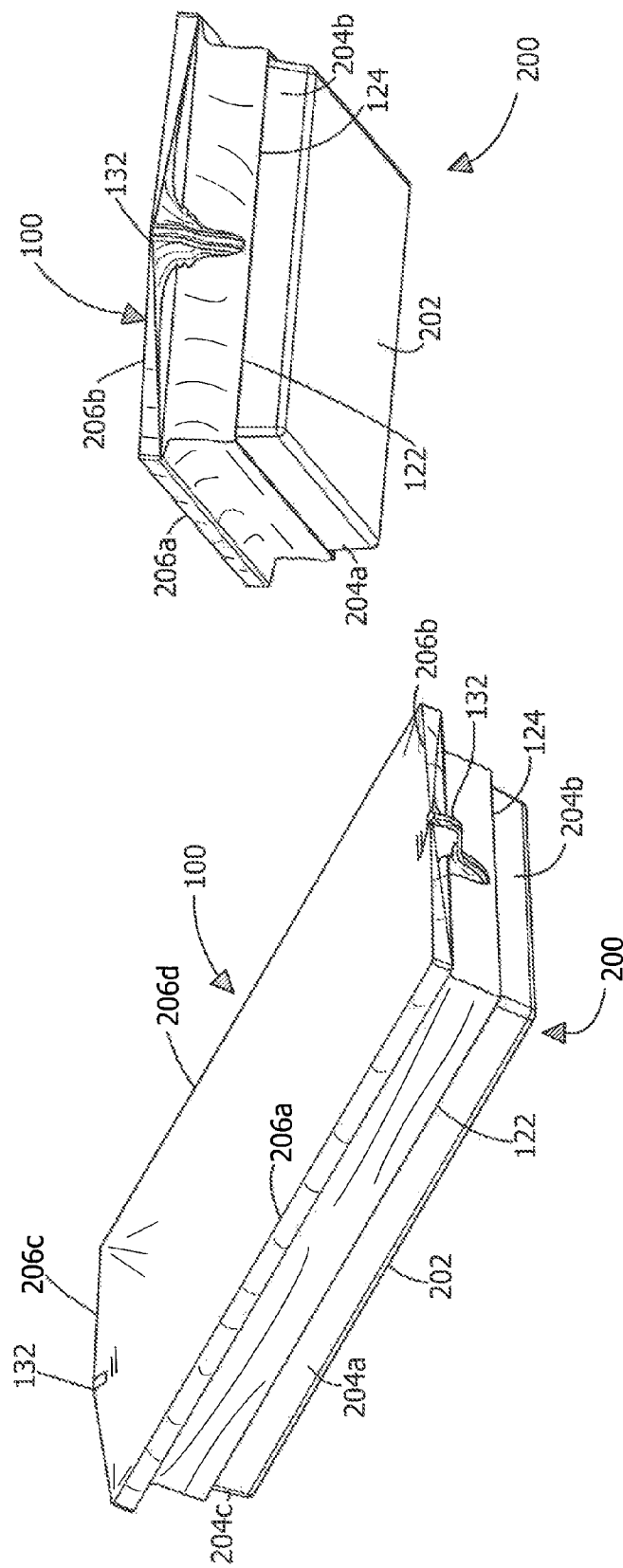
FIGS. 16C and 16D illustrate perspective views of a food pan cover on a food pan after heat-shrinking, according to an embodiment disclosed herein.

FIG. 13 illustrates cover 100, according to a fourth embodiment. FIG. 14 illustrates a section view of the cover 100, according to the fourth embodiment. As shown, for example, in FIG. 14, in addition to the features of the third embodiment, described above, the fourth embodiment can include first angled seal 103. Second angled seal 105 can be located at an opposite end of cover 100, for example, as shown in FIG. 15B. First angled seal 103 can seal first lateral wall 106 to first top panel 117 of gusset 116 from first side seal 102 to first top edge 112. Second angled seal 105 can seal first lateral wall 106 and first top panel 117 from second side seal 104 to first top edge 112. As shown, for example, in FIG. 15C, third angled seal 107 can seal second lateral wall 108 and second top panel 118 from first side seal 102 to second top edge 114. Fourth angled seal 109 can seal second lateral wall 108 and second top panel 118 from second side seal 104 to second top edge 114.

FIGS. 15A-15D illustrate the fourth embodiment of cover 100 placed over pan 200, prior to heat-shrinking. As shown, for example, in FIG. 15C, the design of the fourth embodiment can create pockets 134 in cover 100 when placed over pan 200.

FIGS. 16A-16D illustrate the fourth embodiment of cover 100, after heat-shrinking. As shown, for example, in FIGS. 16B and 16D, some excess material 132 can accumulate at side walls 204b and 204c after heat-shrinking. Generally, the fourth embodiment of cover 100 can provide a better seal between cover 100 and pan 200 than the first and second embodiments of cover 100, and at least as good as the third embodiment of cover 100. As shown, for example, in FIGS. 16C and 16D, a tight seal can be formed between first bottom edge 122 and side walls 204a-c, and between second bottom edge 124 and side walls 204b-d.

Figure 19:
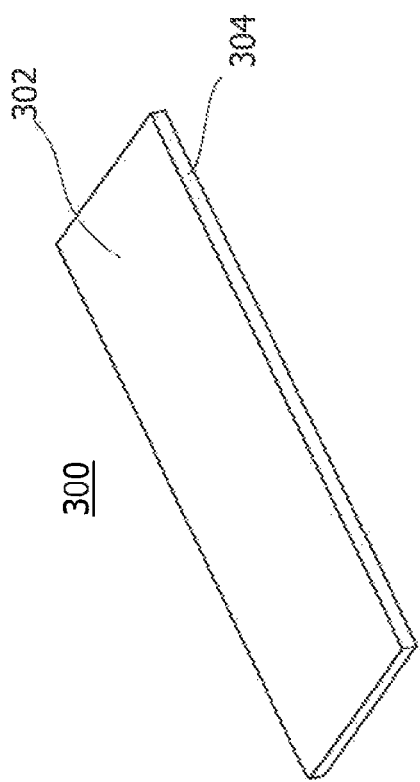
FIG. 19 illustrates a pre-formed cover in accordance with yet another embodiment.
Figure 20:
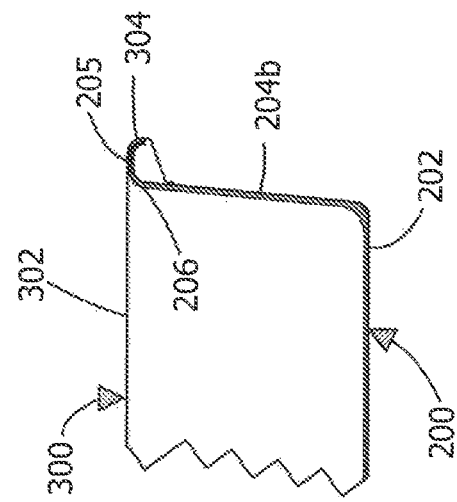
FIG. 20 is a sectional view showing the cover of FIG. 19 to a pan.

In the embodiments set forth above, cover 100 has a shallow bag-like structure and is formed from a thin film. In an alternate embodiment 300, shown in FIG. 19, the cover is pre-formed into a shape to match the shape of the open end of a pan to be covered. Cover 300 can be formed, for example, by thermoforming from a material having the properties described above but from a thicker film. For example, the film can be approximately five to twenty mils (0.005" to 0.020") thick. As shown in FIG. 19, cover 300 includes a planar portion 302 and an edge portion 304. FIG. 20 is a sectional view showing cover 300 fit to pan 200. Edge portion 304 is configured to mate with edge 206 and a flange 205 of pan 200. As illustrated, edge portion 304 has a "U" shaped cross sectional shape to mate with flange 205. Once fitted to a pan, heat may be applied to cover 300 (e.g., by placing the pan and cover combination into a heated oven for cooking) to shrink cover 300 so that it snugly fits and seals the top opening of pan 200.

As an example implementation of cover 300 suitable for use with a hotel pan-medium, cover 300 can have dimensions of 21.5" long by 13.5" wide with an edge portion having a depth or thickness of 0.25" to wrap around flange 205. In this example embodiment, cover 300 can be thermoformed from MQ520 film in a thickness of 5 mils (0.005").

Certain embodiments of the food pan covers include features that facilitate removal of the cover from the pan after heat-shrinking. Rather than, for example, cutting the cover off with scissors or a knife, certain embodiments include flaps and/or tabs that can simply be pulled in order to remove the cover from the pan.

Figure 21:
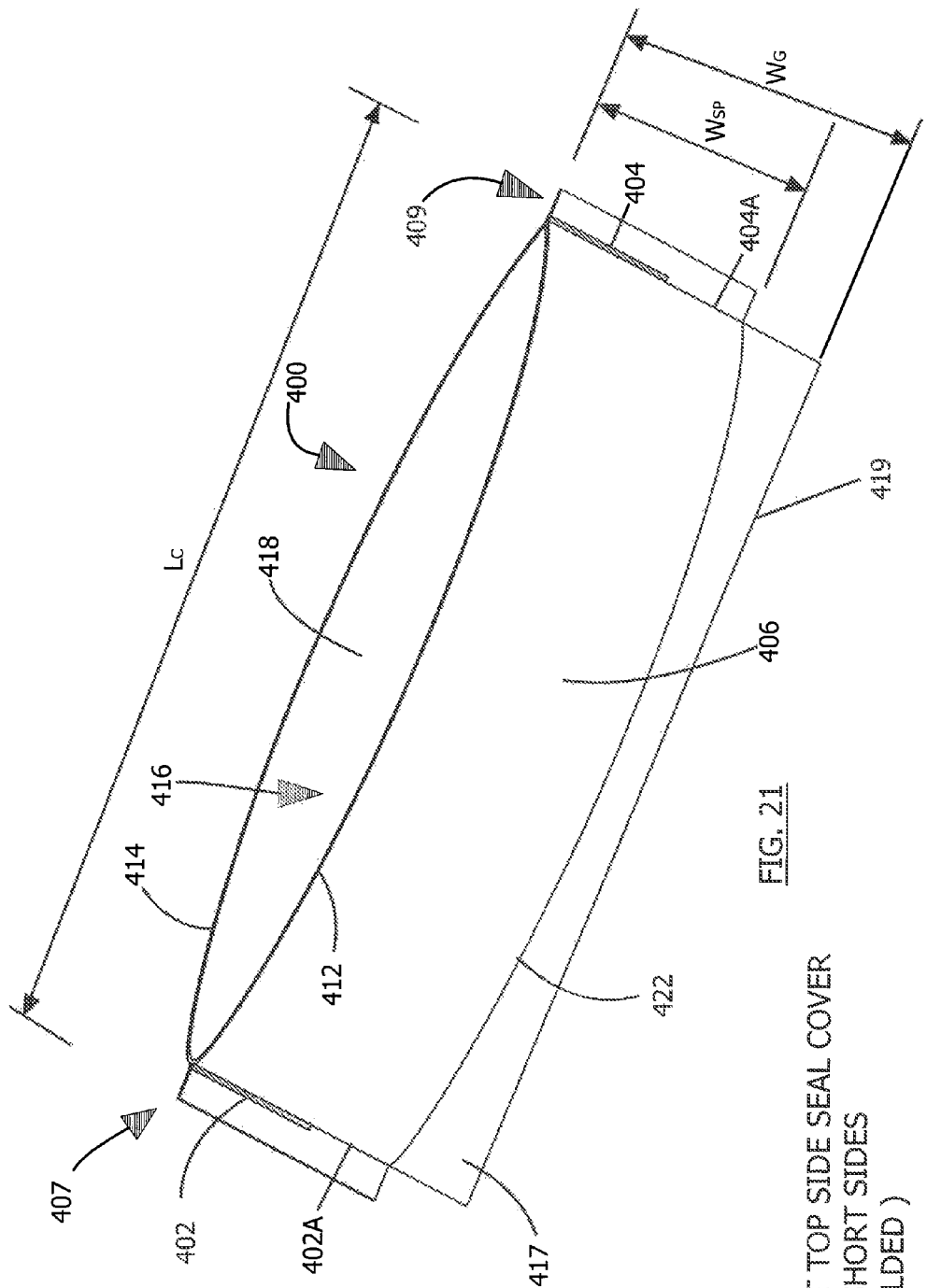
FIG. 21 illustrates a food pan cover, according to an embodiment disclosed herein.
Figure 22:
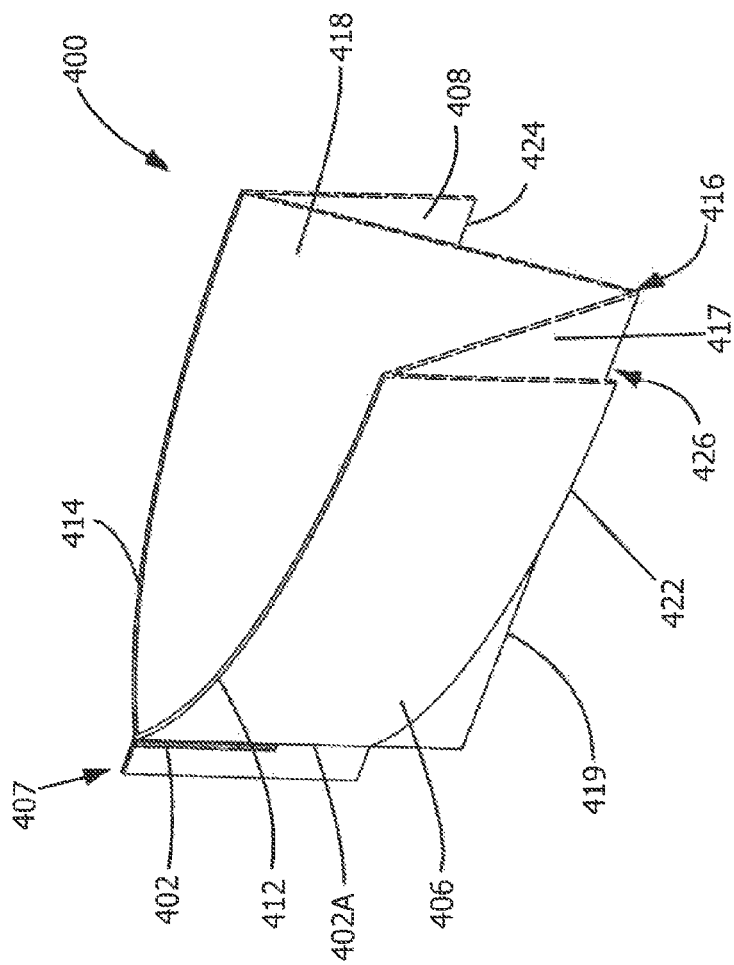
FIG. 22 illustrates a section view of a food pan cover, according to an embodiment disclosed herein.

FIG. 21 illustrates cover 400, according to one such embodiment. FIG. 22 illustrates a section view of cover 400, according to this embodiment. FIGS. 23A and 23B illustrate cover 400 placed over pan 200, prior to heat-shrinking. Pan 200 can be a pan such as the one described above with respect to FIG. 17. In certain embodiments, cover 400 can include first end 407, second end 409, first side panel 406, and second side panel 408 (not visible in FIG. 21). First side panel 406 can have first top edge 412 and first bottom edge 422. Second side panel 408 can have second top edge 414 and second bottom edge 424 (not visible in FIG. 21).

Cover 400 can include gusset 416 between first side panel 406 and second side panel 408. Gusset 416 can include third bottom edge 419. Gusset 416 can have first gusset panel 417 and second gusset panel 418. First gusset panel 417 can be delineated by first end 407, second end 409, first top edge 412, and third bottom edge 419. Second gusset panel 418 can be delineated by first end 407, second end 409, second top edge 414, and third bottom edge 419. There can be a space 426 between first gusset panel 417 and first side panel 406 depending on the orientation of cover 400. A similar space can be created between second gusset panel 418 and second side panel 408.

In certain embodiments, a width ($W_G$) of first gusset panel 417 can be greater than a width ($W_{SP}$) of first side panel 406. And a width ($W_G$) of second gusset panel 418 can be greater than a width ($W_{SP}$) of second side panel 408. The width ($W_G$) of first gusset panel 417 and second gusset panel 418 can be the same or different. The width ($W_{SP}$) of first side panel 406 and second side panel 408 can be the same or different.

Cover 400 can have first side seal 402 extending along a portion of first end 407. First side seal 402 can seal together a portion of each of first side panel 406, second side panel 408, first gusset panel 417, and second gusset panel 418. In certain embodiments, first side seal 402 can begin at or near first top edge 412 and second top edge 414. First side seal 402 can extend toward first bottom edge 422 and second bottom edge 424. In certain embodiments, first side seal 402 can begin on first end 407 at a point below first top edge 412 and second top edge 414 and extend only part way toward bottom edges 422, 424. Such a shortened side seal will create a first unsealed portion 402A on first end 407.

Cover 400 can have second side seal 404 extending along a portion of second end 409. Second side seal 404 can seal together a portion of each of first side panel 406, second side panel 408, first gusset panel 417, and the second gusset panel 418. In certain embodiments, second side seal 404 can begin at or near first top edge 412 and second top edge 414. Second side seal 404 can extend toward first bottom edge 422 and second bottom edge 424. In certain embodiments, second side seal 404 can begin on second end 409 at a point below top edge 412 and second top edge 414 and extend only part way toward edges 422, 424. Such a shortened side seal will create a second unsealed portion 404A on second end 409.

As indicated in FIG. 21, cover 400 has a length ($L_C$), side panels 406 and 408 (not visible in FIG. 21, see FIG. 22) have a width ($W_{SP}$), and gusset panels 417, 418 have a width ($W_G$). Table 3 provides several examples of pan cover dimensions for pan covers that can be used with several standard Gastronorm pan types. Other dimensions are also contemplated.

TABLE 3

| Pan Description | Pan Cover Dimensions $L_C \times W_{SP} \times W_G$ |
|---|---|
| Third Pan | 20.5" × 4.5" × 6.5" |
| Half Pan | 23.75" × 4.5" × 6.5" |
| Full (Hotel) Pan | 34.5" × 5" × 7" |

Generally, side seals 402, 404 of cover 400 are shorter than the width ($W_{SP}$) of side panels 406, 408. In certain embodiments, side seals 402, 404 are approximately 3 inches in length. Other lengths for side seals 402, 404 are contemplated.

As shown, for example, in FIGS. 23A and 23B, cover 400 can be placed over pan 200. In certain embodiments, third bottom edge 419 of gusset 416 can be located approximately along a midpoint of side walls 204b and 204c of pan 200. In certain embodiments, third bottom edge 419 can be located off-center. First gusset panel 417 and/or second gusset panel 418 of gusset 116 can extend only part way between a center of pan 200 and side walls 204a and 204d, or first gusset panel 417 and/or second gusset panel 418 can extend to or beyond side walls 204a and 204d of pan 200. In certain embodiments, first side panel 406 and second side panel 408 extend over top edges 206a and 206d of pan 200, and down along side walls 204a and 204d of pan 200.

Figure 24:
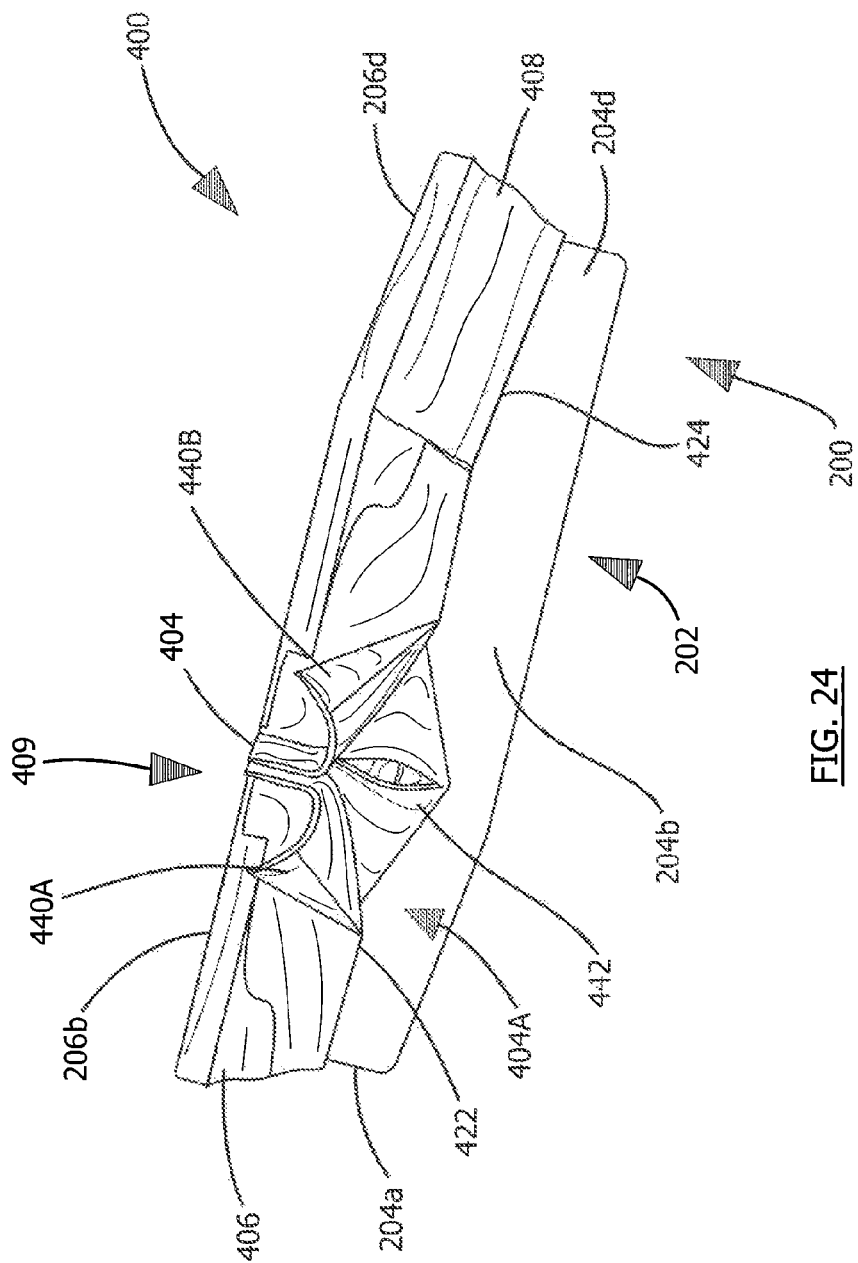
FIG. 24 illustrates a perspective view of a food pan cover on a food pan after heat-shrinking, according to an embodiment disclosed herein.

As shown, for example, in FIG. 24, in certain embodiments, after heat-shrinking cover 400, second unsealed portion 404A of second end 409 can form a first flap 440A and a second flap 440B. Second unsealed portion 404A can also form a tab 442. Similarly, after heat-shrinking, first unsealed portion 402A of first end 407 (not shown) can also have a first flap, a second flap, and a tab. These flaps and tabs can facilitate removing cover 400 off of the pan by pulling the flaps or tabs to tear the cover.

The flaps and tabs can be created when only a portion of first end 407 and second end 409 are sealed with first side seal 402 and second side seal 404, respectively. In certain embodiments, first side seal 402 and/or second side seal 404 can extend along more than half the width ($W_{SP}$) of the side panels. In other embodiments, first side seal 402 and/or second side seal 404 can extend along less than half the width ($W_{SP}$) of the side panels. In certain embodiments, first side seal 402 and/or second side seal 404 can extend along approximately half the width ($W_{SP}$) of the side panels.

The lengths of first side seal 402 and second side seal 404 can also be compared relative to the lengths first gusset panel 417 and second gusset panel 418. In certain embodiments, first side seal 402 and/or second side seal 404 can extend along more than half the width ($W_G$) of the gusset panels. In other embodiments, first side seal 402 and/or second side seal 404 can extend along less than half the width ($W_G$) of the gusset panels. In certain embodiments, first side seal 402 and/or second side seal 404 can extend along approximately half the width ($W_G$) of the gusset panels. Having larger first and second unsealed portions 402A/404A can increase the size of flaps 440A/440B and tab 442.

Like the other covers described herein, cover 400 can be formed from a heat-shrinkable polymeric material. In certain embodiments, the material can be substantially clear (i.e., substantially transparent). In certain embodiments, cover 400 can be a mono-layer film having a thickness of about one mil. Multi-layer films and various thicknesses for cover 400 are also contemplated. In certain embodiments, cover 400 can withstand a temperature of at least about 400 degrees Fahrenheit for at least about two hours.

Food containment systems are also contemplated and disclosed herein. A food containment system can include a pan and a pan cover. For example, the pan and pan cover can be any of those described herein. In certain embodiments, the pan cover can include a gusset and be formed from a single layer of heat-shrinkable polymeric material capable of withstanding a temperature of at least about 400 degrees Fahrenheit. In certain embodiments, the pan can be a Gastronorm pan. By way of example, the Gastronorm pan can be a shallow, medium, or deep third pan. The food pan cover can have a length ($L_C$) between 19 and 21 inches, and the width ($W_G$) of the first and second gusset panels can be between 5 and 7 inches. In certain embodiments, the width ($W_{SP}$) of the first and second side panels can be between 4 and 5 inches.

The food containment system can be used by placing the pan cover over the pan, as shown, for example, in the food containment systems in FIGS. 3A-3D, 7A-7D, 11A-11D, 15A-15D, 20, and 23A-23B. The pan cover can be heated (e.g., using a hot air gun such as a handheld hairdryer, using an infrared lamp or by placing the pan/cover system in an oven), causing the pan cover to shrink and seal about the pan, as shown, for example, in the food containment systems in FIGS. 4A-4D, 8A-8D, 12A-12D, 16A-16D, and 24.

Methods of sealing a food pan are also contemplated and disclosed herein. This method includes the steps of: placing food in a food pan; placing a cover over the pan, and heating at least the cover causing it to shrink-fit to the pan. Heating the cover can be accomplished by exposing the cover to cooking temperatures (e.g., at least 300 degrees Fahrenheit), as opposed to "heat sealing" or "welding" techniques known in the art. Sealing the pan cover about the pan can prevent spillage, leakage, or spoilage of the contents inside the pan.

In certain embodiments described herein, the pan cover includes a gusset. The method of sealing a food pan can include opening the bag-like cover to expand the gusset. Expanding the gusset increases a distance between a first lateral wall and second lateral wall (i.e., formed by the first and second side panels and optionally a portion of the gusset walls) of the pan cover. Increasing the distance between the first and second lateral walls (side panels) improves the fit of the pan cover to the pan.

In certain embodiments, the method can include heating the food, for example, at a temperature of at least about 300 degrees Fahrenheit. In certain embodiments, the food pan cover can be removed by applying a force to (e.g., pulling) at least one of a first flap, a second flap, a third flap, a fourth flap, a first tab, or a second tab of the cover.

While various embodiments have been described herein, they have been presented by way of example only, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but may be interchanged to meet various needs as would be appreciated by one of skill in the art.

It is to be understood that the phraseology or terminology used herein is for the purpose of description and not of limitation. The breadth and scope of the present disclosure should not be limited by any of the above-described exemplary embodiments, but should be defined only in accordance with the following claims and their equivalents.

What is claimed is:

1. A food containment system comprising:
    a Gastronorm pan; and
    a food pan cover comprising:
        a first end;
        a second end;
        a first side panel comprising a first top edge and a first bottom edge;
        a second side panel comprising a second top edge and a second bottom edge;
        a gusset formed between the first side panel and the second side panel, the gusset comprising:
            a third bottom edge;
            a first gusset panel delineated by the first end, the second end, the first top edge, and the third bottom edge,
            wherein a width of the first gusset panel is greater than a width of the first side panel; and
            a second gusset panel delineated by the first end, the second end, the second top edge, and the third bottom edge,
            wherein a width of the second gusset panel is greater than a width of the second side panel;
        a first side seal extending along a portion of the first end, sealing together a portion of each of the first side panel, the second side panel, the first gusset panel, and the second gusset panel; and
        a second side seal extending along a portion of the second end, sealing together a portion of each of the first side panel, the second side panel, the first gusset panel, and the second gusset panel;
    wherein the food pan cover is formed from a heat-shrinkable material.

2. The food containment system of claim 1, wherein the first end comprises a sealed portion and an unsealed portion.

3. The food containment system of claim 2, wherein after heat-shrinking the food pan cover, the unsealed portion of the first end comprises a first flap and a second flap.

4. The food containment system of claim 3, wherein the unsealed portion of the first end further comprises a first tab.

5. The food containment system of claim 2, wherein the second end comprises a sealed portion and an unsealed portion.

6. The food containment system of claim 5, wherein after heat-shrinking the food pan cover, the unsealed portion of the second end comprises a third flap and a fourth flap.

7. The food containment system of claim 6, wherein the unsealed portion of the second end further comprises a second tab.

8. The food containment system of claim 1, wherein at least one of the first or second side seal extends along more than half the width of the first or second side panel.

9. The food containment system of claim 1, wherein at least one of the first or second side seal extends along less than half the width of the first or second side panel.

10. The food pan cover of claim 1, wherein at least one of the first or second side seal extends along approximately half the width of the first or second side panel.

11. The food containment system of claim 1, wherein at least one of the first or second side seal extends along more than half the width of the first or second gusset panel.

12. The food containment system of claim 1, wherein at least one of the first or second side seal extends along less than half the width of the first or second gusset panel.

13. The food containment system of claim 1, wherein at least one of the first or second side seal extends along approximately half the width of the first or second gusset panel.

14. The food containment system of claim 1, wherein the width of the first side panel is approximately equal to the width of the second side panel.

15. The food containment system of claim 1, wherein the width of the first gusset panel is approximately equal to the width of the second gusset panel.

16. The food containment system of claim 1, wherein the heat-shrinkable material is substantially clear.

17. The food containment system of claim 1, wherein the heat-shrinkable material is a mono-layer film having a thickness of about one mil.

18. The food containment system of claim 1, wherein the heat-shrinkable material is a polymeric material.

19. The food containment system of claim 1, wherein the heat-shrinkable material is capable of withstanding a temperature of at least about 400 degrees Fahrenheit for at least about two hours.

20. The food containment system of claim 1, wherein the pan comprises:
   a bottom surface; and
   one or more side walls extending upwardly from the bottom surface, each side wall having a top edge defining a top opening of the pan.

21. The food containment system of claim 20, wherein at least a portion of the first side panel is located outside a first side wall of the pan and at least a portion of the second side panel is located outside a second side wall of the pan, when the pan cover is covering the pan.

22. The food containment system of claim 20, wherein the pan cover is configured to shrink when heat is applied to the pan cover so that the pan cover engages a peripheral lip of the pan at the top opening to cover and seal the top opening.

23. The food containment system of claim 1, wherein the food pan cover is sized to fit about the Gastronorm pan.

24. The food containment system of claim of claim 23, where the Gastronorm pan is one of a shallow, medium, or deep third pan.

25. The food containment system of claim 24, wherein the food pan cover has a length between 19 and 21 inches, and wherein the width of the first and second gusset panels is between 5 and 7 inches.

26. The food containment system of claim of claim 25, where the width of the first and second side panels is between 4 and 5 inches.

27. A food containment system comprising:
   a Gastronorm pan; and
   a food pan cover configured to fit about the Gastronorm pan comprising:
      a first end;
      a second end;
      a first side panel comprising a first top edge and a first bottom edge;
      a second side panel comprising a second top edge and a second bottom edge;
      a gusset formed between the first side panel and the second side panel, the gusset comprising:
         a third bottom edge;
         a first gusset panel delineated by the first end, the second end, the first top edge, and the third bottom edge,
         wherein a width of the first gusset panel is greater than a width of the first side panel; and
         a second gusset panel delineated by the first end, the second end, the second top edge, and the third bottom edge,
         wherein a width of the second gusset panel is greater than a width of the second side panel;
      a first side seal extending along a portion of the first end, sealing together a portion of each of the first side panel, the second side panel, the first gusset panel, and the second gusset panel; and
      a second side seal extending along a portion of the second end, sealing together a portion of each of the first side panel, the second side panel, the first gusset panel, and the second gusset panel;
   wherein the food pan cover is formed from a heat-shrinkable polymeric material capable of withstanding a temperature of at least about 400 degrees Fahrenheit for at least about two hours;
   wherein the first end comprises a sealed portion and an unsealed portion, and wherein the second end comprises a sealed portion and an unsealed portion;
   wherein after heat-shrinking the food pan cover, the unsealed portion of the first end comprises a first flap, a second flap, and a first tab; and
   wherein after heat-shrinking the food pan cover, the unsealed portion of the second end comprises a third flap, a fourth flap, and a second tab.

28. A food containment system comprising:
   a Gastronorm pan; and
   a food pan cover comprising:
      a first end;
      a second end;
      a first side panel comprising a first top edge and a first bottom edge;
      a second side panel comprising a second top edge and a second bottom edge;
      a gusset formed between the first side panel and the second side panel, the gusset comprising:
         a third bottom edge;
         a first gusset panel delineated by the first end, the second end, the first top edge, and the third bottom edge,
         wherein a width of the first gusset panel is between 5 and 7 inches and a width of the first side panel is between 4 and 5 inches; and
         a second gusset panel delineated by the first end, the second end, the second top edge, and the third bottom edge,
         wherein a width of the second gusset panel is between 5 and 7 inches and a width of the second side panel is between 4 and 5 inches;
      a first side seal extending along a portion of the first end, sealing together a portion of each of the first side panel, the second side panel, the first gusset panel, and the second gusset panel; and
      a second side seal extending along a portion of the second end, sealing together a portion of each of the first side panel, the second side panel, the first gusset panel, and the second gusset panel;
   wherein the food pan cover is formed from a heat-shrinkable material.

* * * * *